March 15, 1938.   H. E. KÄMMEL   2,110,987
SHIFT AND DRIVING MECHANISM FOR ADDING MACHINES
Filed April 23, 1934   21 Sheets-Sheet 1

H. E. Kämmel
INVENTOR

By: Marks & Clerk
Attys.

March 15, 1938. H. E. KÄMMEL 2,110,987
SHIFT AND DRIVING MECHANISM FOR ADDING MACHINES
Filed April 23, 1934 21 Sheets-Sheet 2

H. E. Kämmel
INVENTOR

By: Marks & Clerk
Attys.

March 15, 1938. H. E. KÄMMEL 2,110,987
SHIFT AND DRIVING MECHANISM FOR ADDING MACHINES
Filed April 23, 1934    21 Sheets-Sheet 3

H. E. Kämmel
INVENTOR
By: Marks & Clerk
ATTYS.

March 15, 1938. H. E. KÄMMEL 2,110,987
SHIFT AND DRIVING MECHANISM FOR ADDING MACHINES
Filed April 23, 1934 21 Sheets-Sheet 5
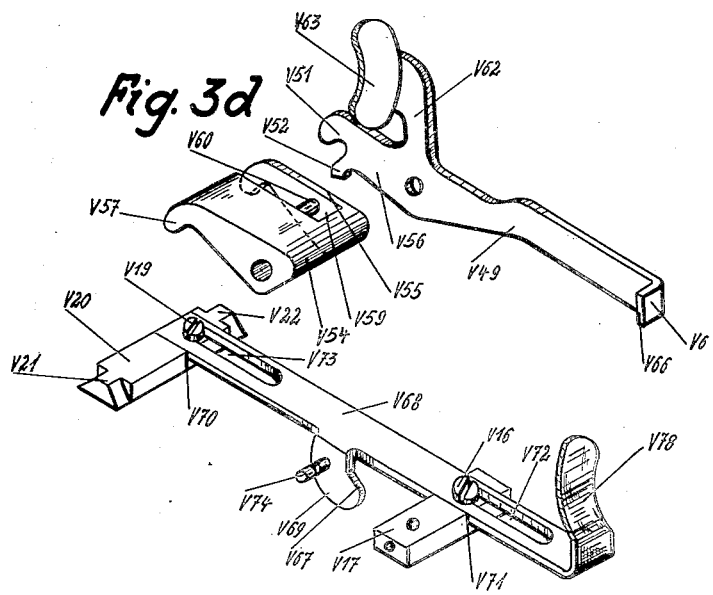
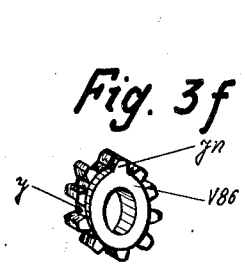
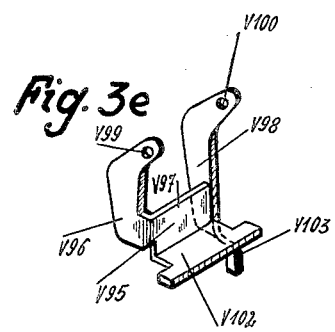
H. E. Kämmel
INVENTOR

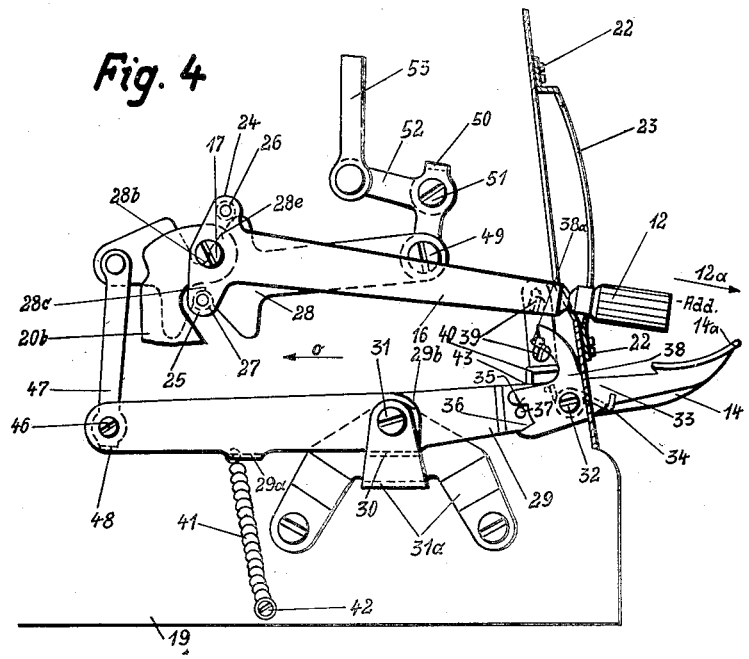
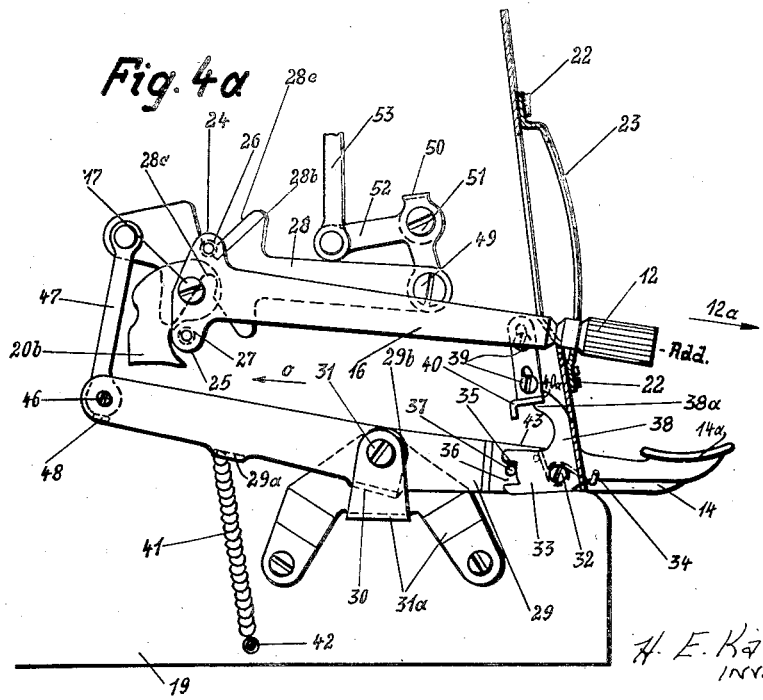

March 15, 1938.  H. E. KÄMMEL  2,110,987
SHIFT AND DRIVING MECHANISM FOR ADDING MACHINES
Filed April 23, 1934   21 Sheets-Sheet 7
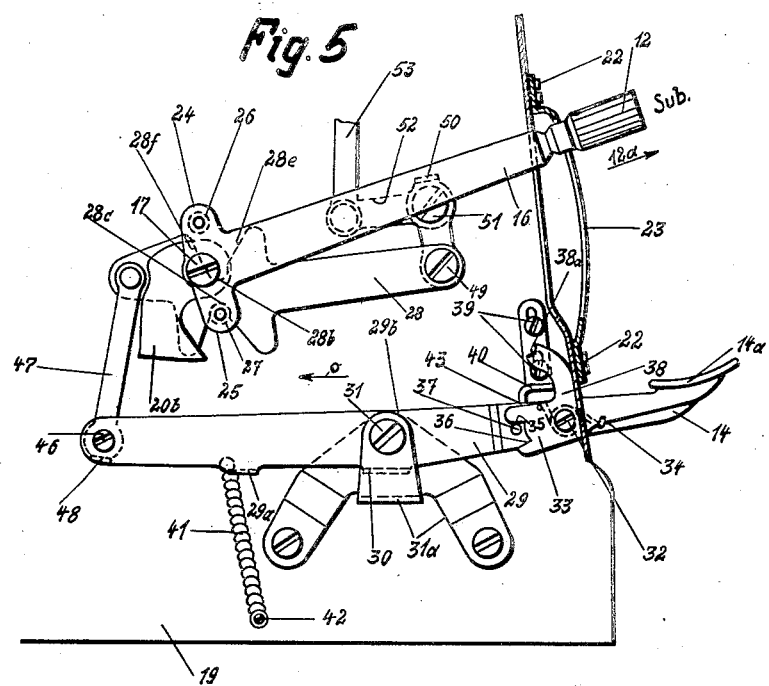
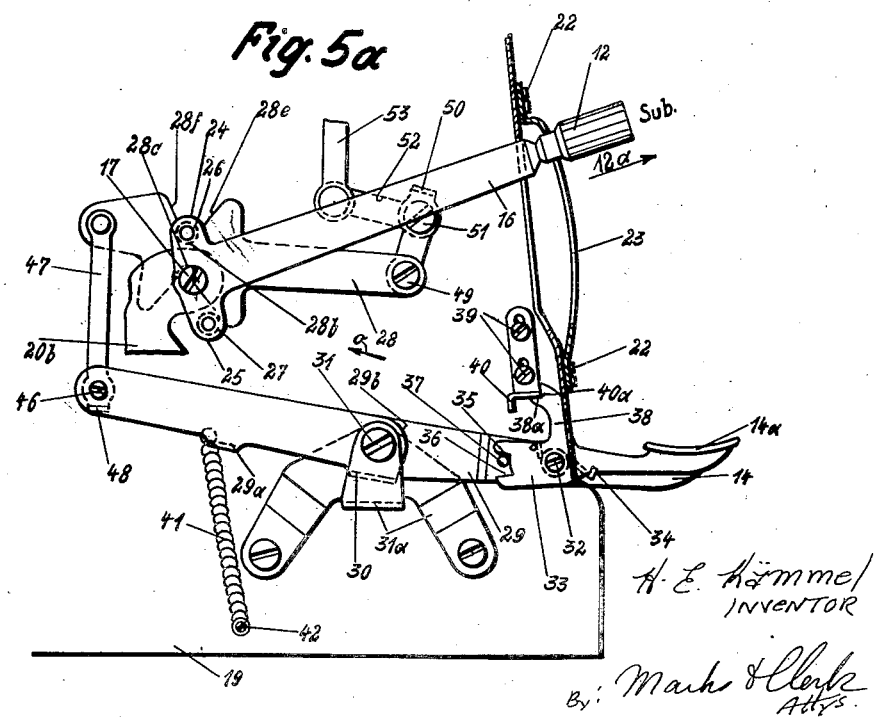

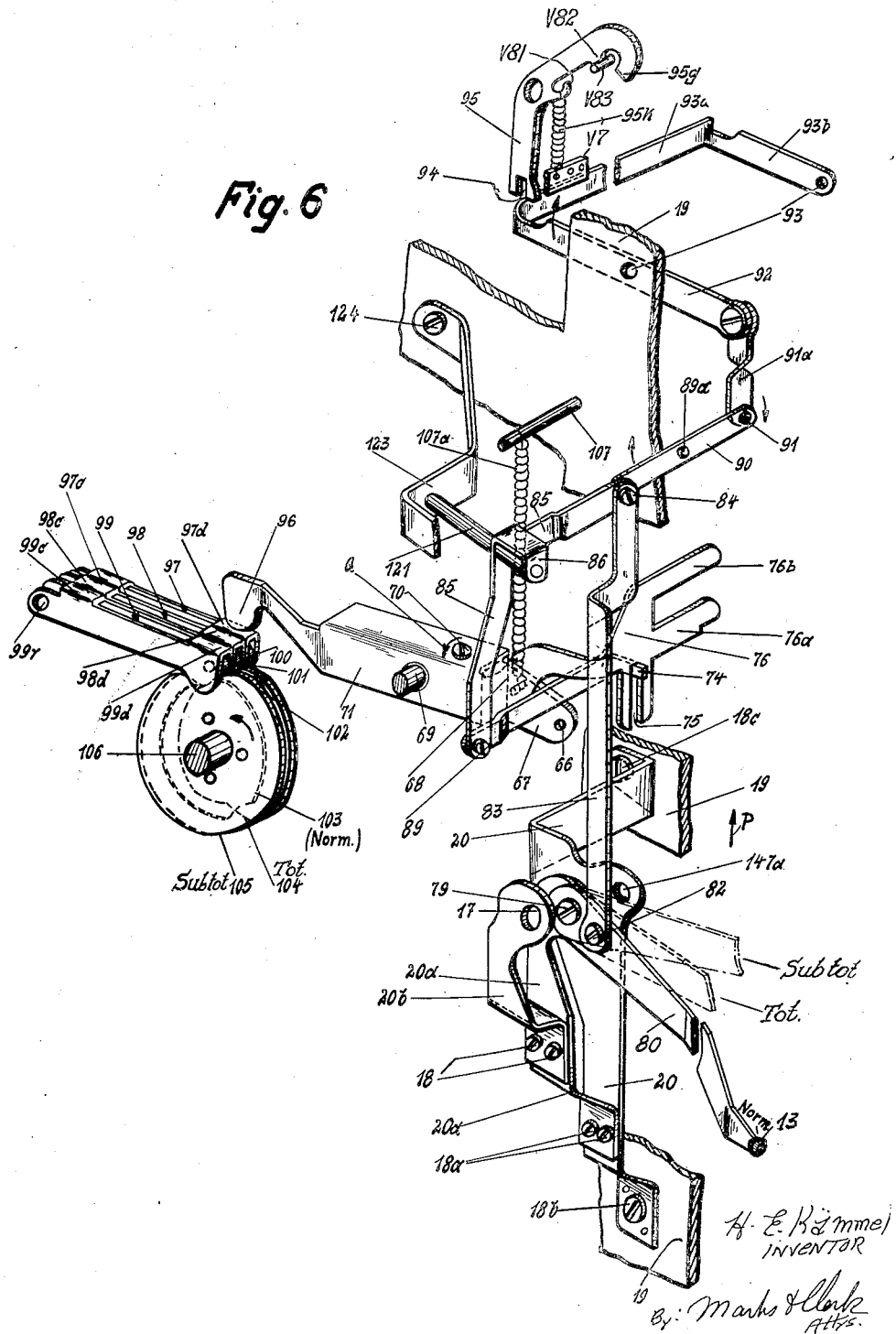

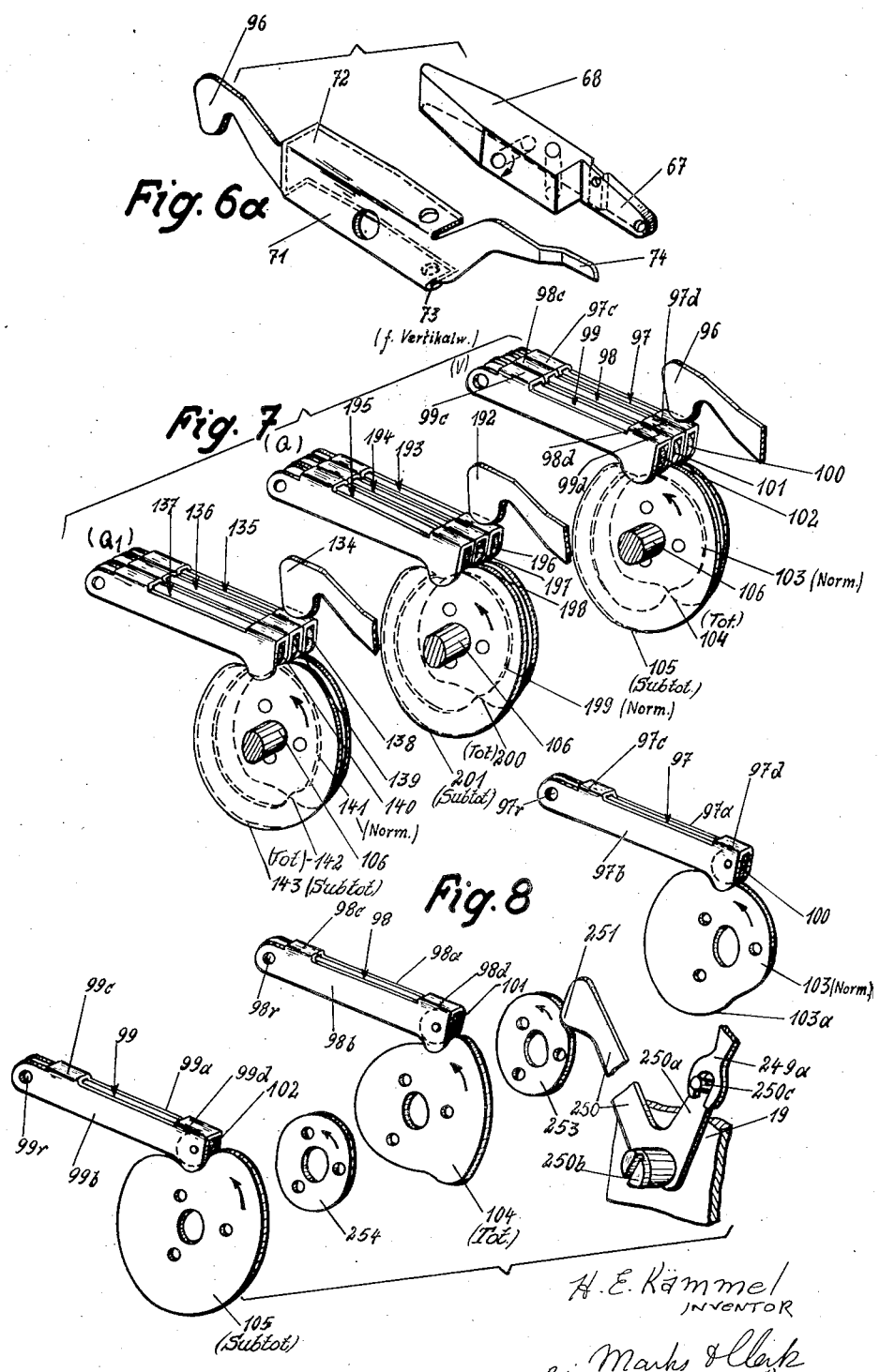

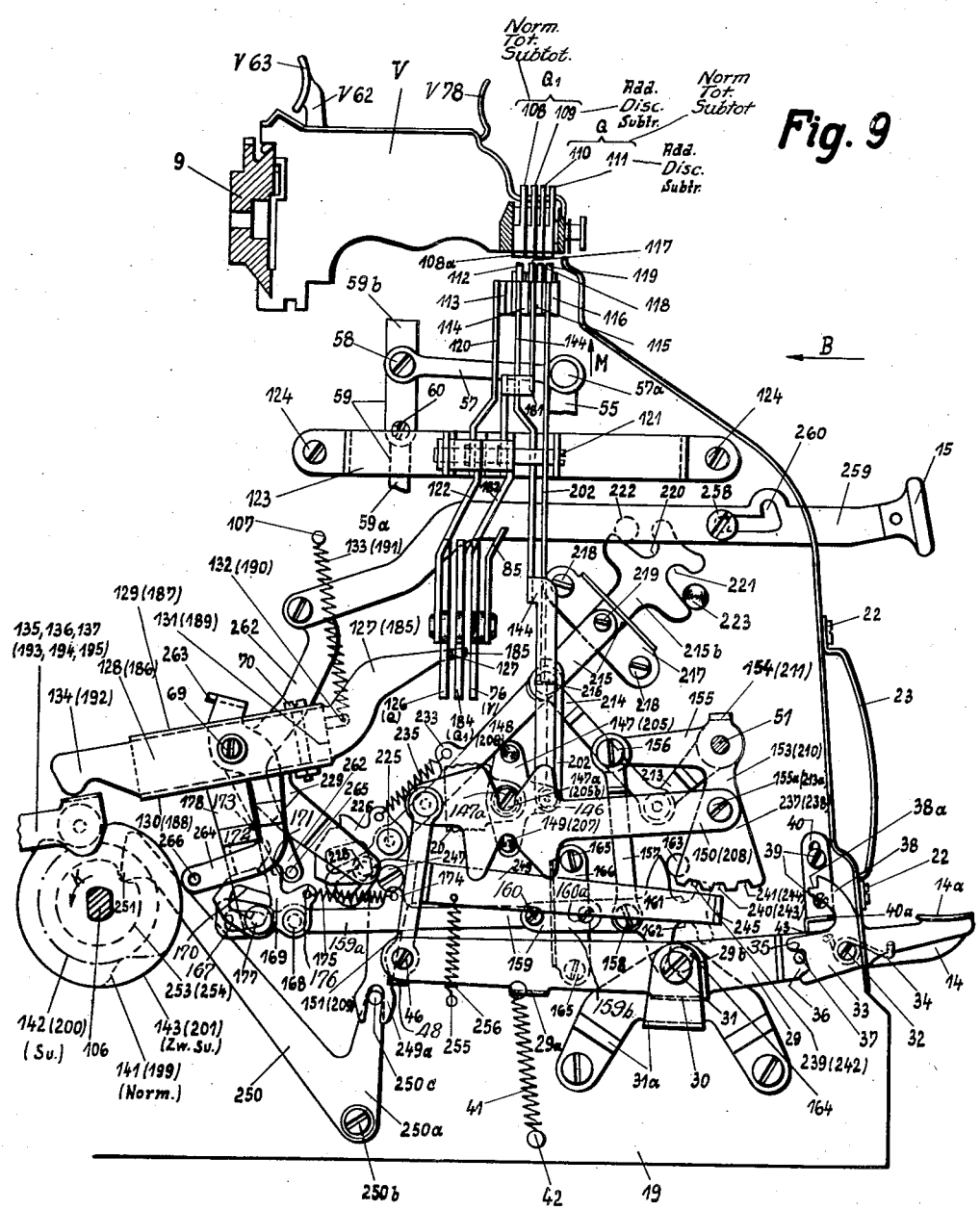

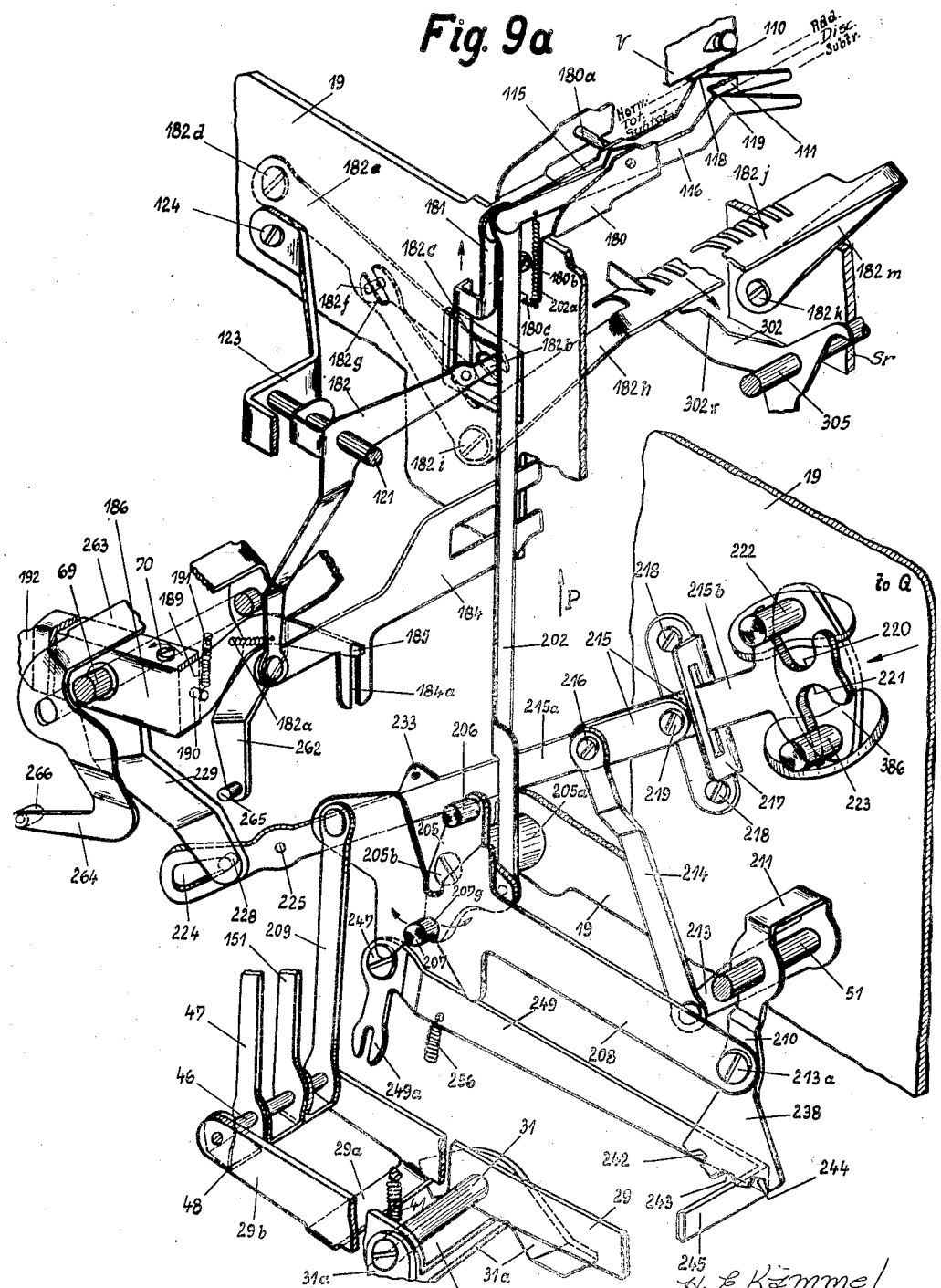

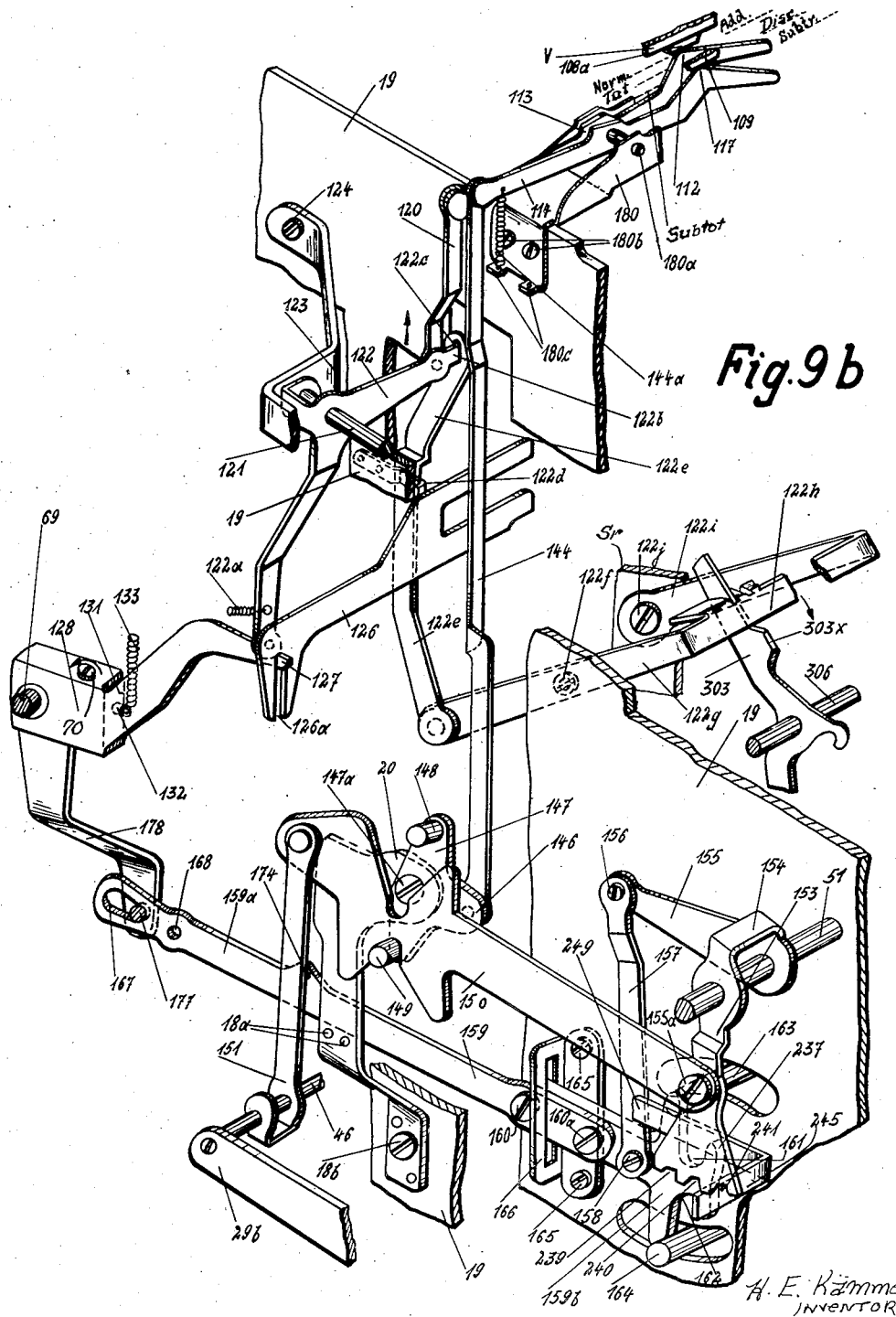

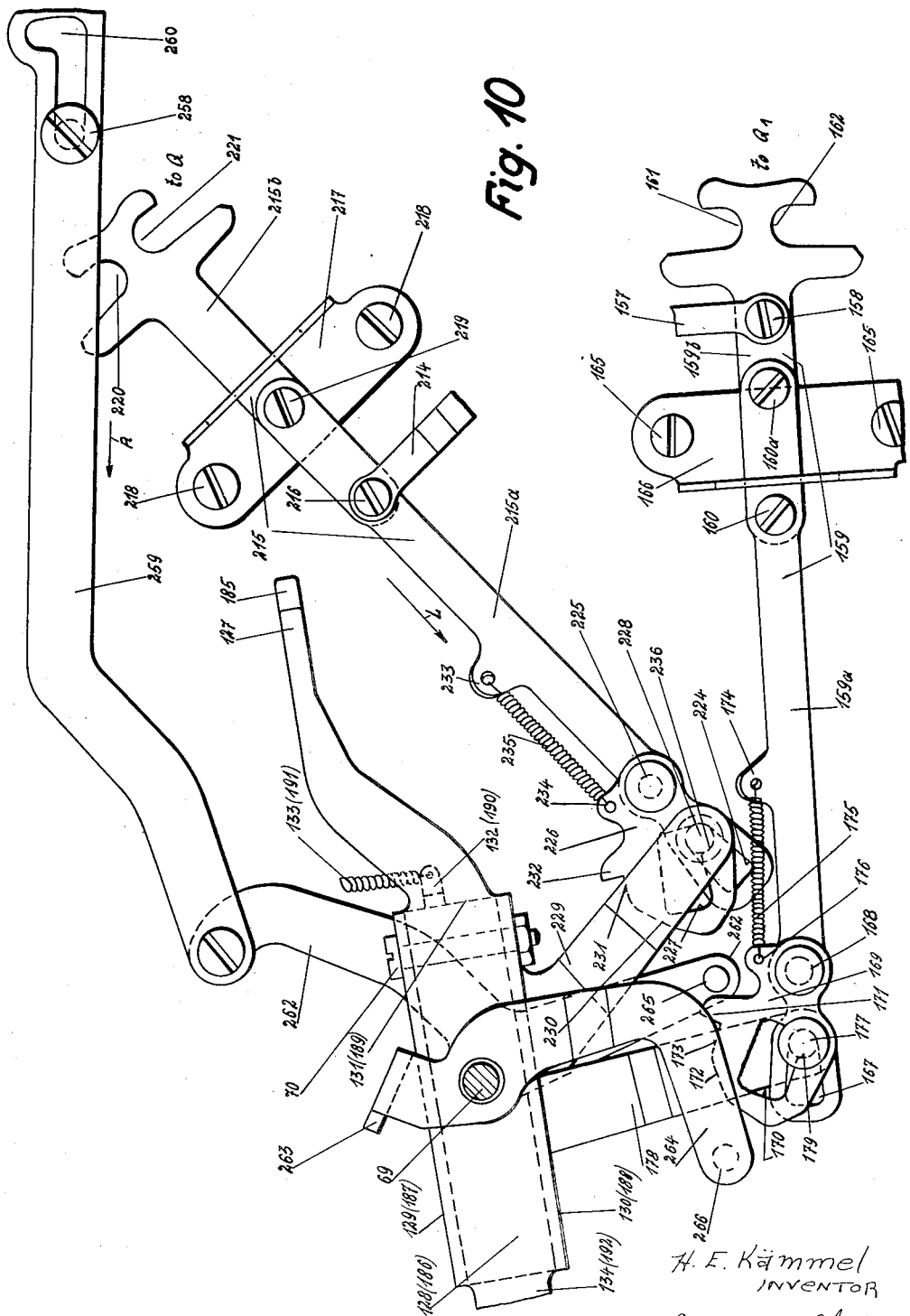

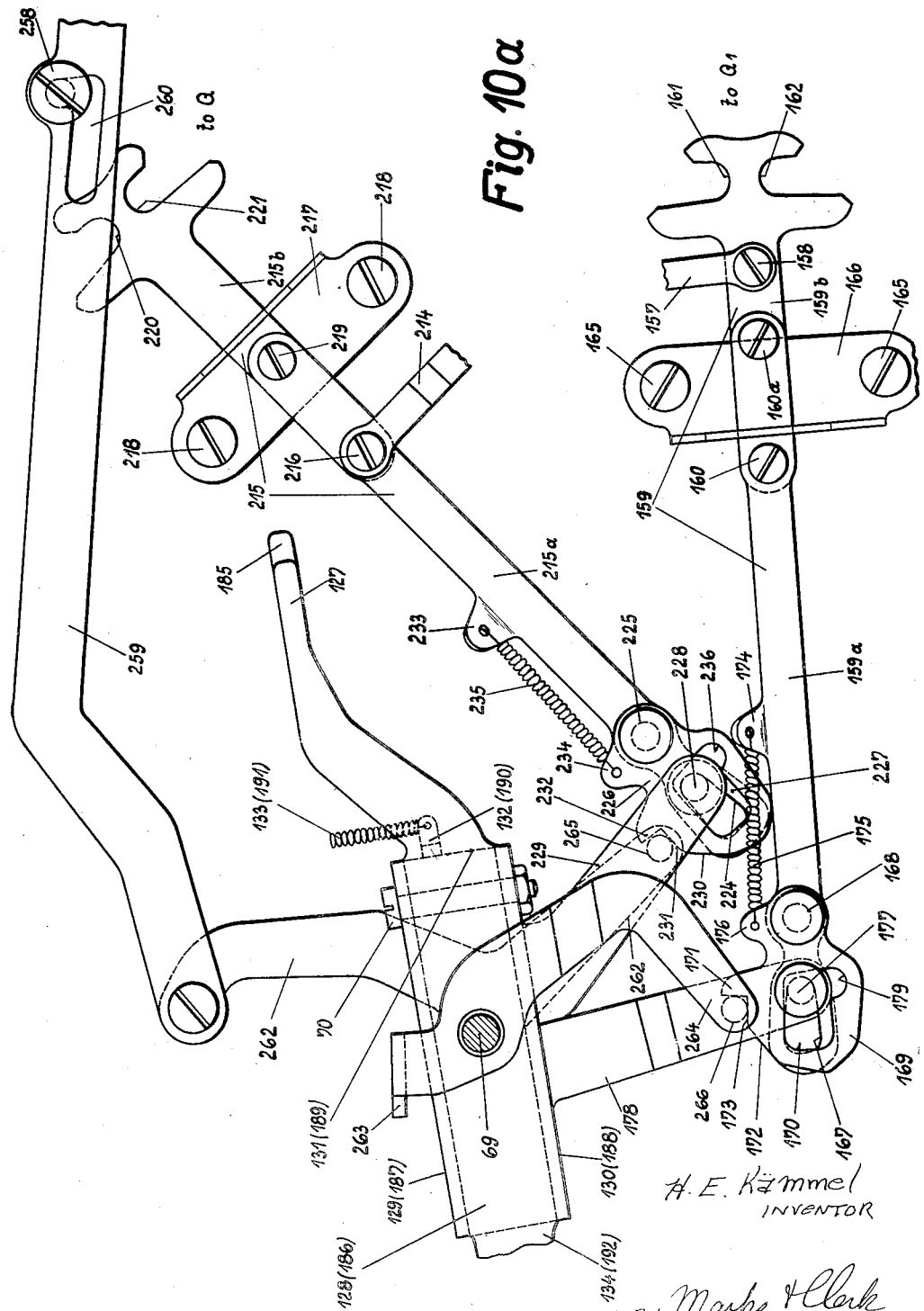

March 15, 1938. H. E. KÄMMEL 2,110,987
SHIFT AND DRIVING MECHANISM FOR ADDING MACHINES
Filed April 23, 1934 21 Sheets-Sheet 15

H. E. Kämmel
INVENTOR
By: Marks & Clerk
Attys.

March 15, 1938.     H. E. KÄMMEL     2,110,987
SHIFT AND DRIVING MECHANISM FOR ADDING MACHINES
Filed April 23, 1934     21 Sheets-Sheet 16

H. E. Kämmel
INVENTOR

By Marks & Clark
ATTYS.

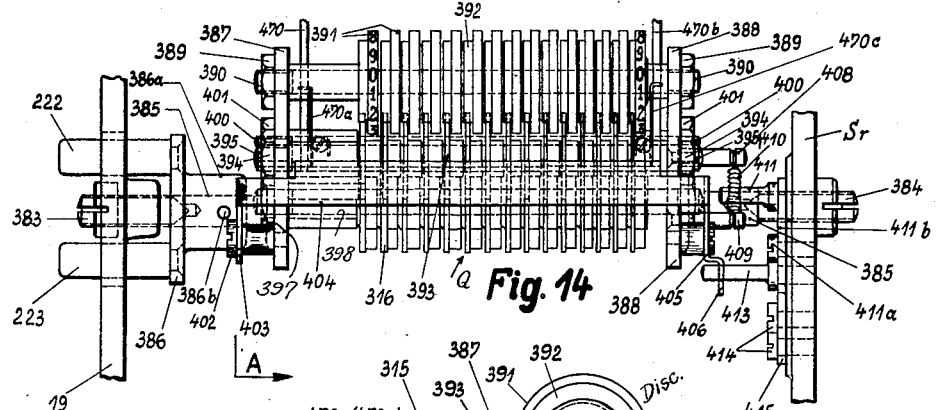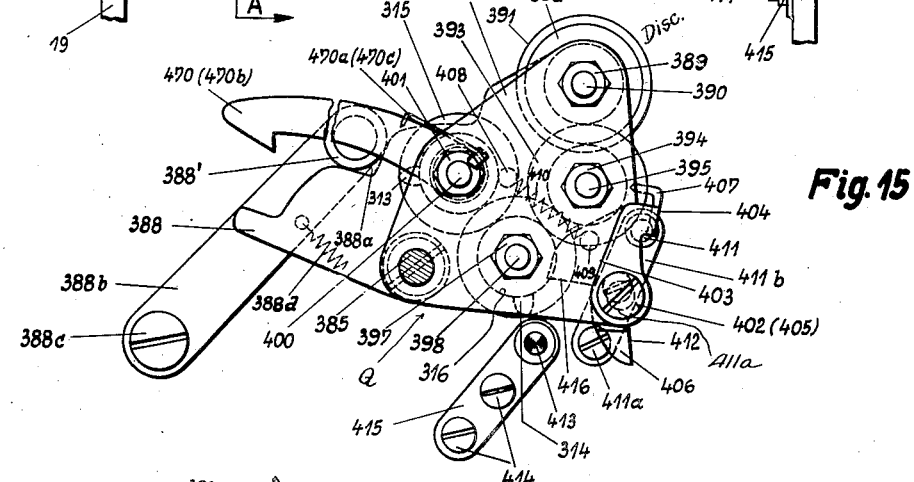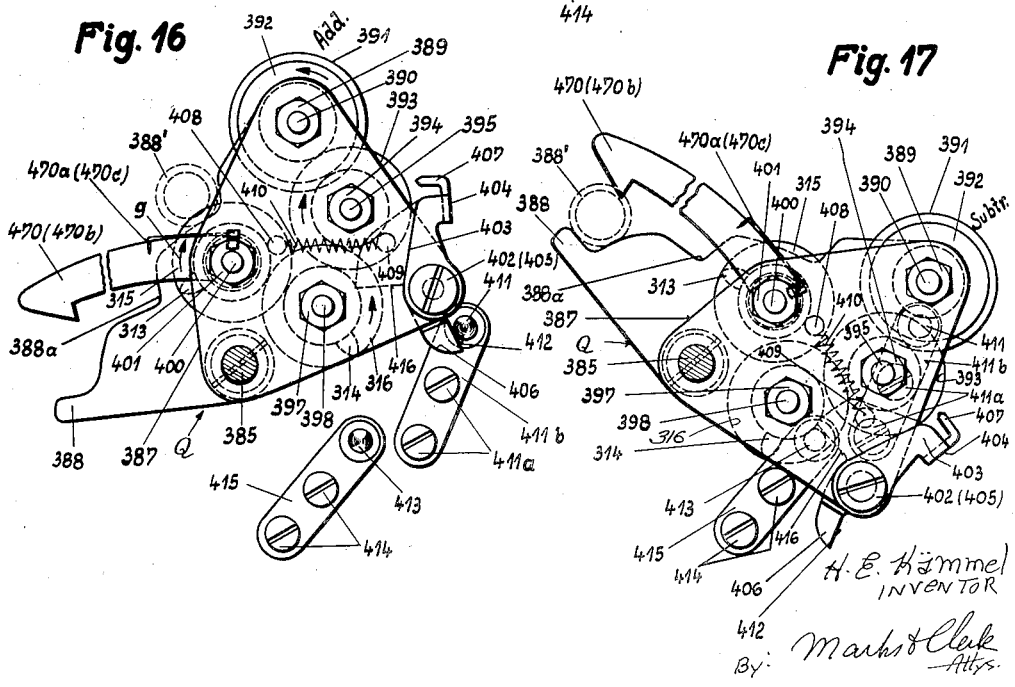

March 15, 1938.　　　　H. E. KÄMMEL　　　　2,110,987
SHIFT AND DRIVING MECHANISM FOR ADDING MACHINES
Filed April 23, 1934　　　21 Sheets-Sheet 18
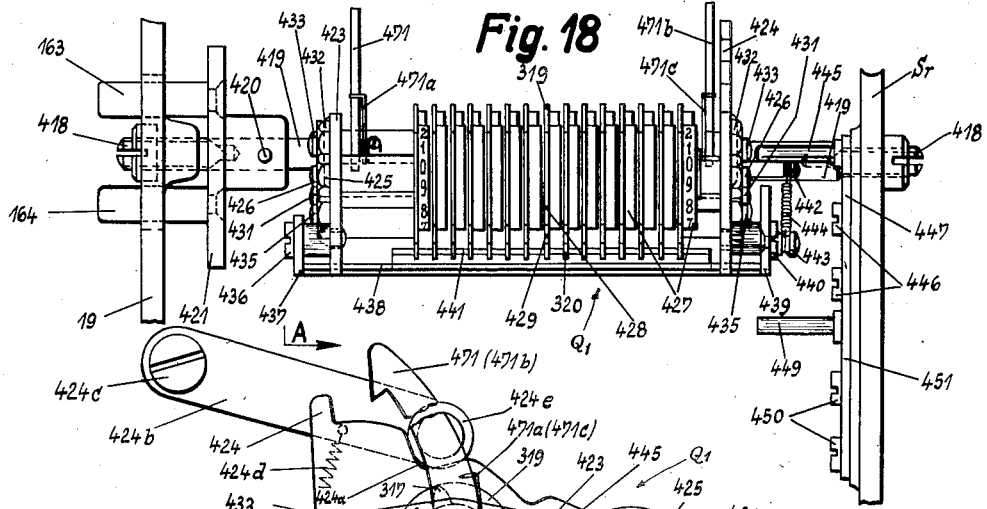
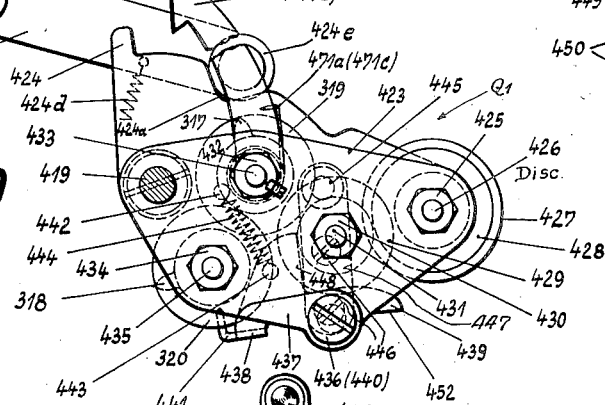
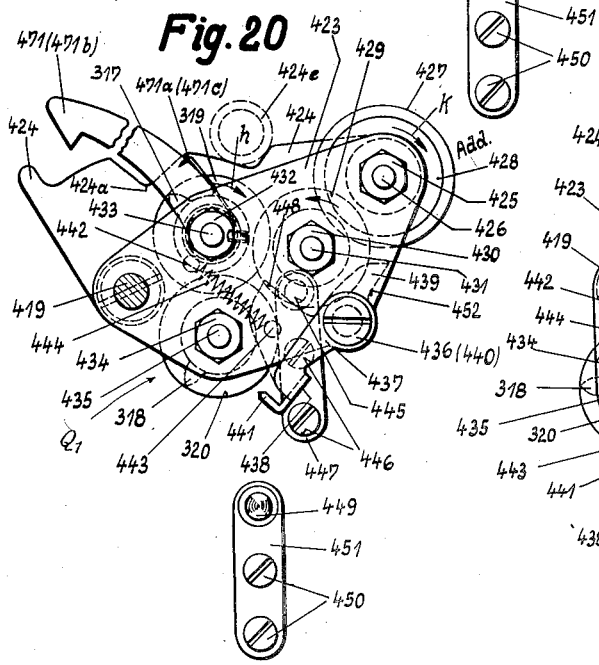
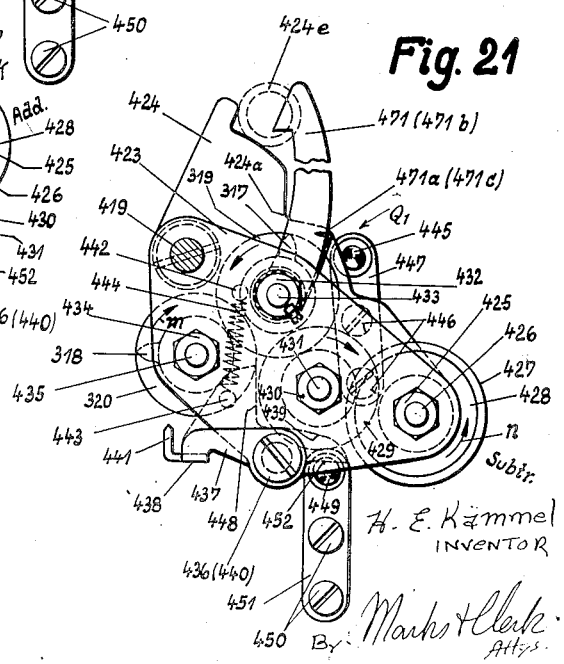

March 15, 1938.  H. E. KÄMMEL  2,110,987
SHIFT AND DRIVING MECHANISM FOR ADDING MACHINES
Filed April 23, 1934   21 Sheets-Sheet 20

H. E. Kämmel
INVENTOR

By Mark & Clerk
ATTYS.

March 15, 1938.     H. E. KÄMMEL     2,110,987
SHIFT AND DRIVING MECHANISM FOR ADDING MACHINES
Filed April 23, 1934     21 Sheets-Sheet 21

Fig. 25

| Registers | Adjustment by | Adjustment by | Adjustment by | |
|---|---|---|---|---|
| Vertical totalizers | Lever 12 on Add. Disc. Sub. | Key 14 on Sub. Disc. Add. | Lever 13 on {Norm, Total, Subtotal} {Norm, Total, Subtotal} Owing to the disconnect position lever 12 or Key 14 inoperative {Norm, Total, Subtotal} | |
| Cross footer Q | Lever 116 on Add. Disc. Sub. | Key 14 on Sub. Disc. Add. | Lever 115 on {Norm, Total, Subtotal} {Norm, Total, Subtotal} Owing to the disconnect position on lever 12 or Key 14 inoperative {Norm, Total, Subtotal} | All these operations may be made inoperative by depressing button 15 |
| Cross footer Q₁ | Lever 114 on Add. Disc. Sub. | Key 14 on Sub. Disc. Add. | Lever 113 on {Norm, Total, Subtotal} {Norm, Total, Subtotal} Owing to the disconnect position lever 12 or Key 14 inoperative {Norm, Total, Subtotal} | |

H. E. Kämmel
INVENTOR

By Marks & Clark
ATTYS

Patented Mar. 15, 1938

2,110,987

UNITED STATES PATENT OFFICE 2,110,987

SHIFT AND DRIVING MECHANISM FOR ADDING MACHINES

Hugo Ernst Kämmel, Zella-Mehlis in Thuringia, Germany, assignor to Mercedes Buromaschinen-Werke Aktiengesellschaft, Benshausen, Thuringia, Germany Application April 23, 1934, Serial No. 722,025
In Germany April 24, 1933

15 Claims. (Cl. 235—60)

The invention relates to a shift and driving mechanism for adding machines, cash registers and the like, and particularly for adding machines coupled to typewriters.

In these machines, as is known, the totalizers are capable of being changed-over for the different kinds of calculation, as well as for taking of totals and subtotals, but in these machines, however, the separate methods of operation were not capable of being combined at will.

According to the invention this disadvantage is overcome by arranging that the time point for engaging and disengaging the totalizer with the calculating segments is controllable through a number of control members with which a selector member of the set of rods for engaging and disengaging the totalizer is capable of being coupled at will, and that a set of rods controlling the calculating direction is in driving connection with the set of rods for engaging and disengaging the totalizer.

In the drawings one form of construction of the subject of the invention is illustrated by way of example.

Figure 3a shows a cross-sectional elevation of a column totalizer.

Figure 3b is a front elevation of the column totalizer.

Figure 3c is a sectional elevation of the totalizer illustrated in Figure 3, the section being taken on the line 3c—3c of Figure 3a.

Figure 3d is a perspective view of the members for attaching the totalizer.

Figure 3e is a detail of a retaining device in perspective, shown in Figure 3a.

Figure 3f shows another detail of Figure 3a, viewed in perspective.

Figures 4 and 4a show the control lever for the column totalizers set for addition, wherein in Figure 4a, the general change-over key is represented in the depressed position.

Figures 5 and 5a show the control lever for the column totalizers set for subtraction, wherein in Figure 5a, the general change-over key is illustrated in the depressed position.

Figure 6 shows in perspective representation mechanisms controlling the column totalizers from "normal" to "total" or "sub-total".

Figure 6a shows detail parts of Figure 6 separated from one another.

Figure 7 shows in perspective representation the series of control cams for shifting the column totalizers and the two cross totalizers from "normal" to "total" or "sub-total".

Figure 8 shows a control cam series for the column totalizers, wherein the separate parts are illustrated drawn out from one another.

Figure 1:
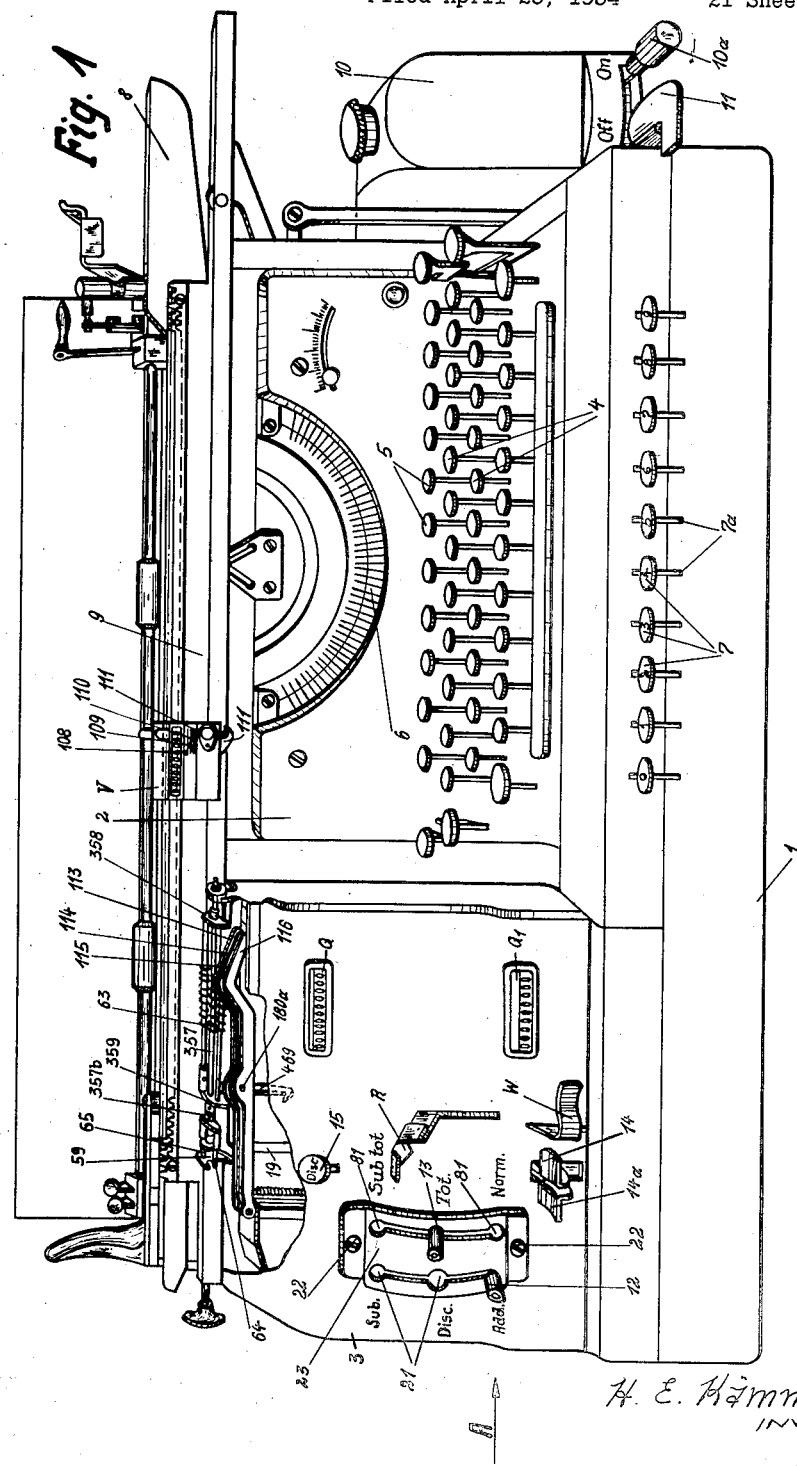
Figure 1 shows in perspective a front elevation of a power-driven typewriter coupled with an adding machine, the front wall being illustrated as partly broken off.

Figure 9 shows the mechanisms controlling the two cross totalizers from "disconnected" to "addition" or "subtraction" and from "normal" to "total" and "sub-total", together with the mechanism for setting the cross totalizers by hand on "disconnected", the view being taken in the direction of the arrow A in Figure 1, and the left hand side wall being omitted for the purpose of disclosing the mechanisms.

Figure 9a shows the mechanisms in perspective for controlling the upper cross totalizer.

Figure 9b shows the mechanisms in perspective for controlling the lower cross totalizer.

Figure 10 shows on an enlarged scale, the mechanisms for setting the two cross totalizers on "disconnected", the "disconnected" key not being depressed.

Figure 10a shows the same mechanisms as Figure 10 with, however, the "disconnected" key depressed.

Figure 11:
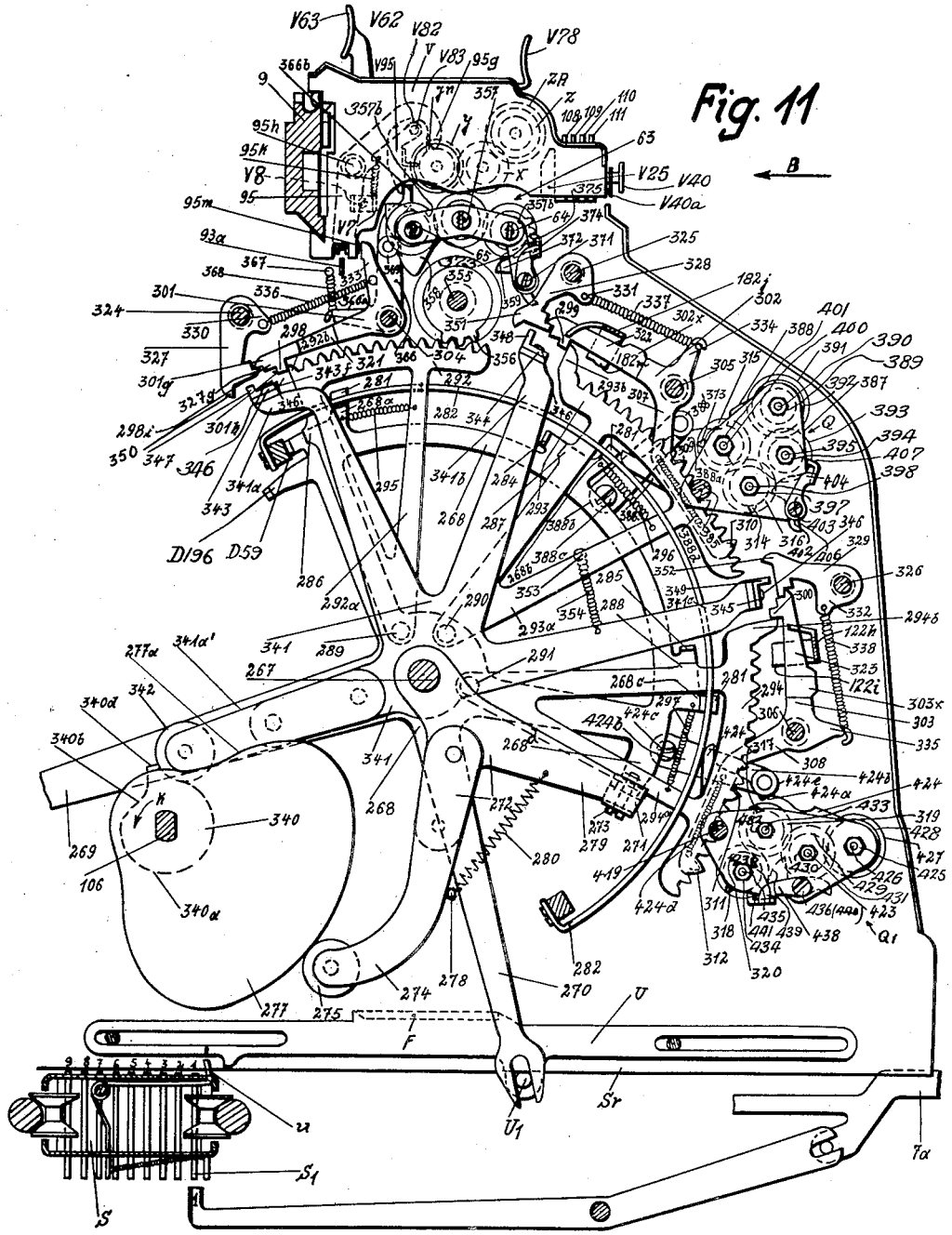

Figure 11 shows in the rest position, the toothed segments driving the column totalizers and the cross totalizers, in which figure a part of the members is omitted for the purpose of showing the toothed segments and other parts.

Figure 12:
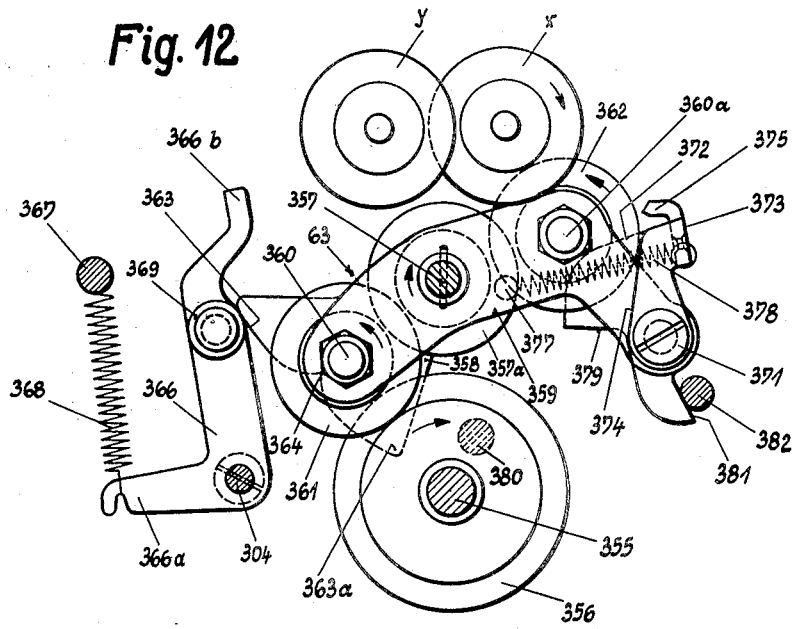

Figure 12 shows a detail of Figure 11, with the change-over gear for the column totalizers in the "addition" position.

Figure 13:
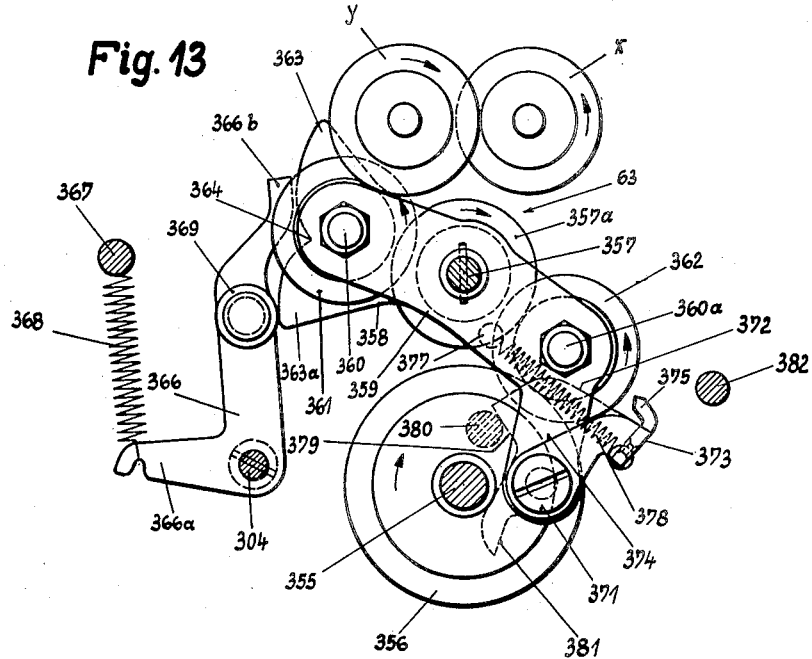

Figure 13 shows the same detail as in Figure 12, but in the subtraction position.

Figure 14 shows an elevation towards the upper cross totalizer Q shown in Figure 11, and viewed in the direction of the arrow "B" in Figure 11.

Figure 15 shows an elevation of the upper cross totalizer Q, viewed in the direction of the arrow "A" in Figure 14, in the "disconnected" position.

Figure 16 shows an elevation of the upper cross totalizer Q, viewed in the direction of the arrow "A" in Figure 14, in the "addition" position.

Figure 17 shows an elevation of the upper cross totalizer Q, viewed in the direction of the arrow "A", in Figure 14, in the "subtraction" position.

Figure 18 shows an elevation of the lower cross totalizer Q₁ viewed in the direction of the arrow "B" in Figure 11.

Figure 19 shows an elevation of the lower totalizer Q₁, viewed in the direction of the arrow "A" in Figure 18, in the "disconnected" position.

Figure 20 shows an elevation of the lower cross totalizer Q₁, viewed in the direction of the arrow "A" in Figure 18, in the "addition" position.

Figure 21 shows an elevation of the lower cross totalizer Q₁, viewed in the direction of the arrow "A" in Figure 18, in the "subtraction" position.

Figure 22:
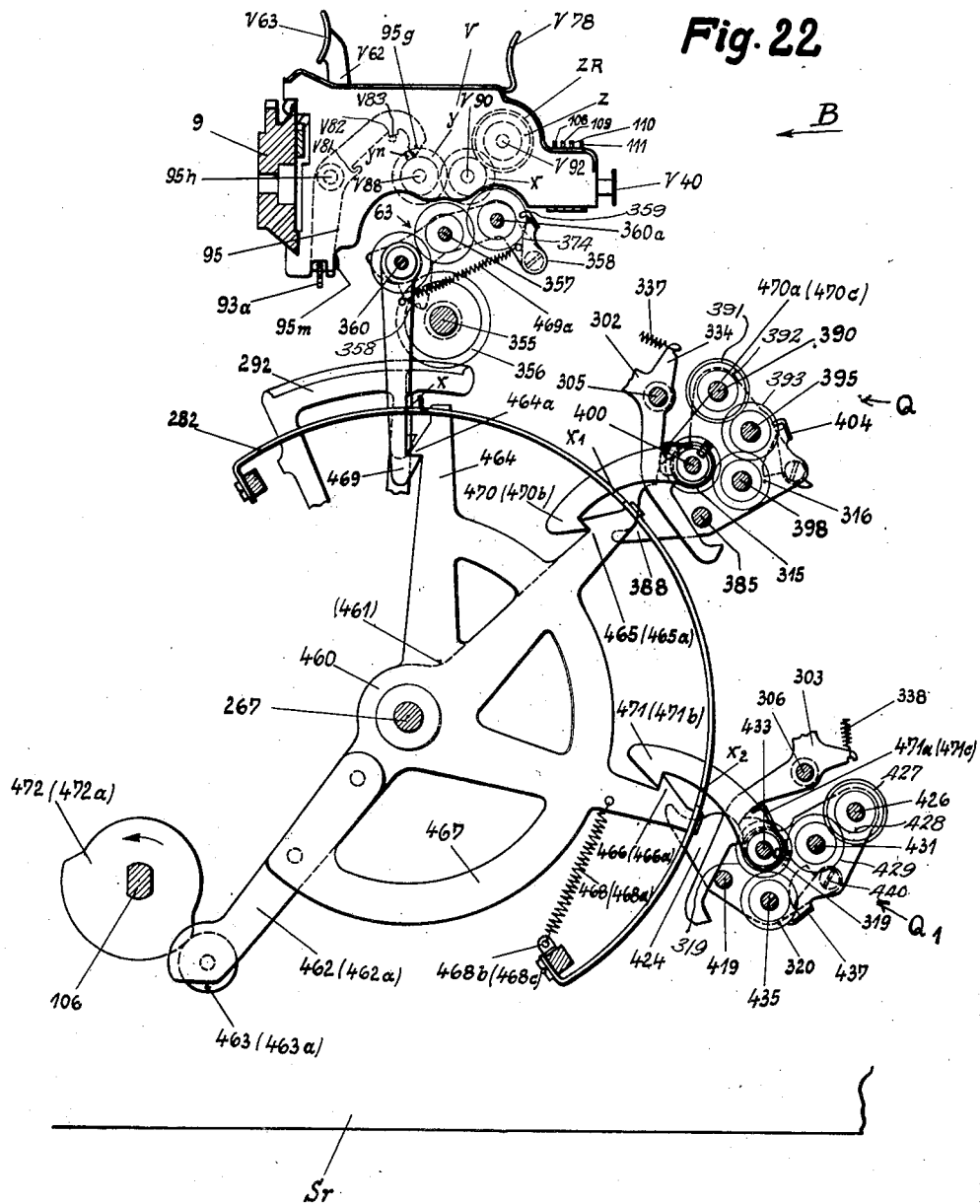

Figure 22 shows an elevation towards a section in the direction of the arrow "A" in Figure 1, with the locking mechanisms for the totalizers located in the operative position, in which elevation the plane of section lies behind the plane of section illustrated in Figure 11.

Figure 23:
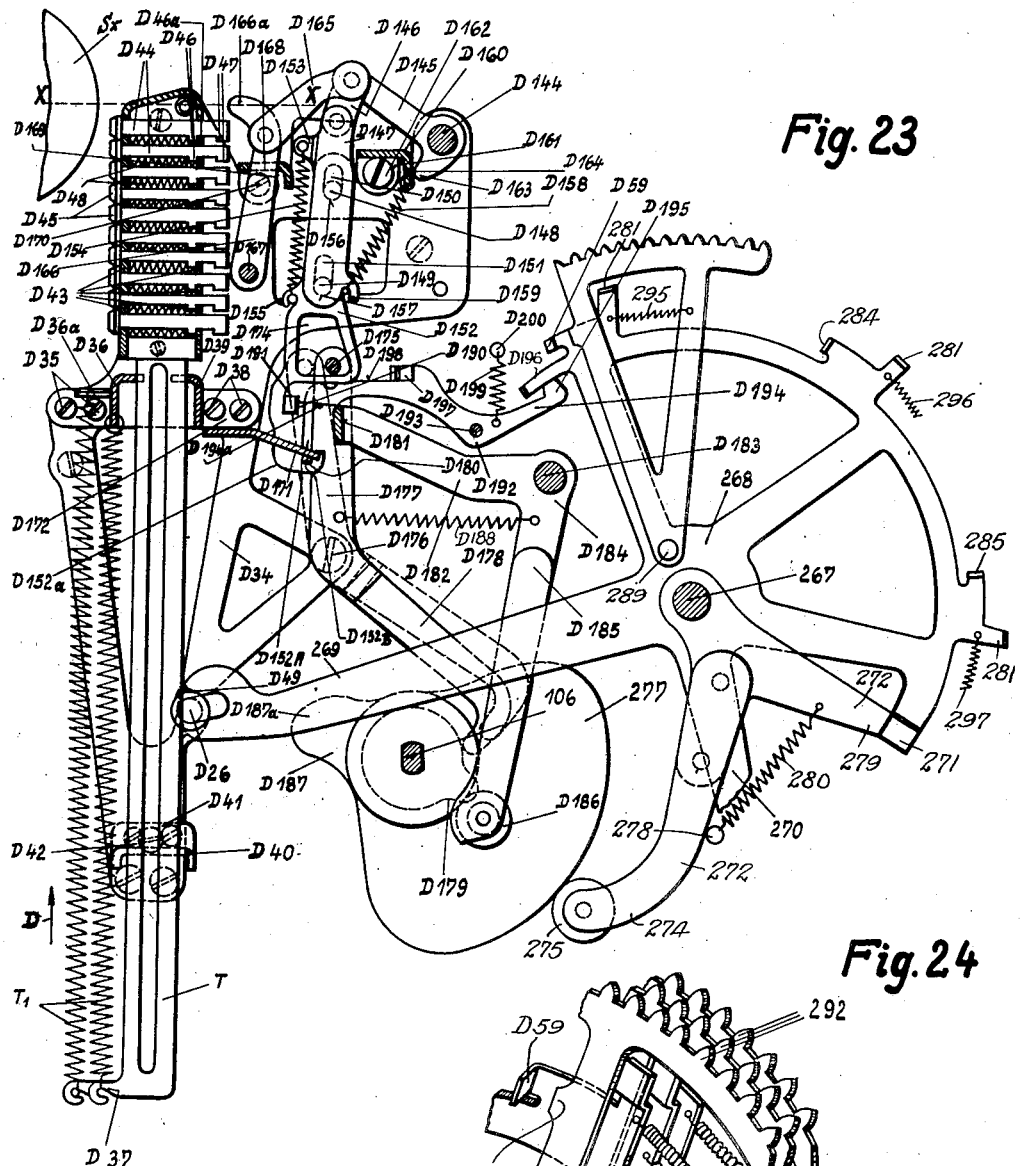

Figure 23 shows an elevation towards the type printing rod and looking towards the printing mechanism, this figure representing a continuation to the left of Figure 11.

Figure 24:
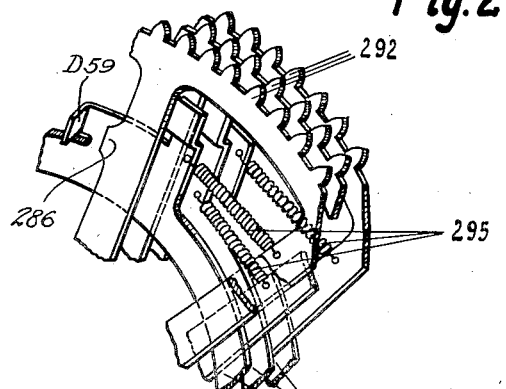

Figure 24 shows a perspective representation of the toothed segments lying side-by-side with the springs positioned in staggered relation to one another.

Figure 25 shows a table of the possible methods of operation.

General description

On the common base-plate 1 (Figure 1) a power-driven typewriter, 2, is arranged, for example, at the right thereof, and an adding machine, 3, is arranged at the left thereof. The typewriter, 2, is provided with the usual letter keys, 4, and typing numeral keys, 5, which, in known manner, are connected with the type levers, 6. Underneath the letter keys, 4, there are arranged ten calculating keys, 7, having numbers "0" to "9", for the adding machine. On a rail, 9 (Figures 1, 2, 3, 9, 11, and 22) attached to the paper carriage, 8, (Figure 2) of the typewriter, 2, a number of column totalizers, V, are arranged so as to be readily detachable and attachable in order that their position longitudinally on the rail, 9, can be arranged to correspond to the column work to be performed as occasion arises. To the right on the typewriter, there is arranged a driving motor, 10, which is capable of being switched on and off by a knob, 10a. By depression of a key, 11, located on the right-hand side of the typewriter, 2, a single cycle clutch (not illustrated) is closed, which is located in the left-hand part of the adding machine, 3, and is mounted on a shaft, 106 (Figure 9) from which all the parts are driven. The levers, 7a (Figures 1 and 11) of the ten calculating keys, 7, arranged on the typewriter, 2, on their depression set stops, S₁, in a stop carriage, S, (Figure 11) located in the adding machine, 3.

Figure 2:
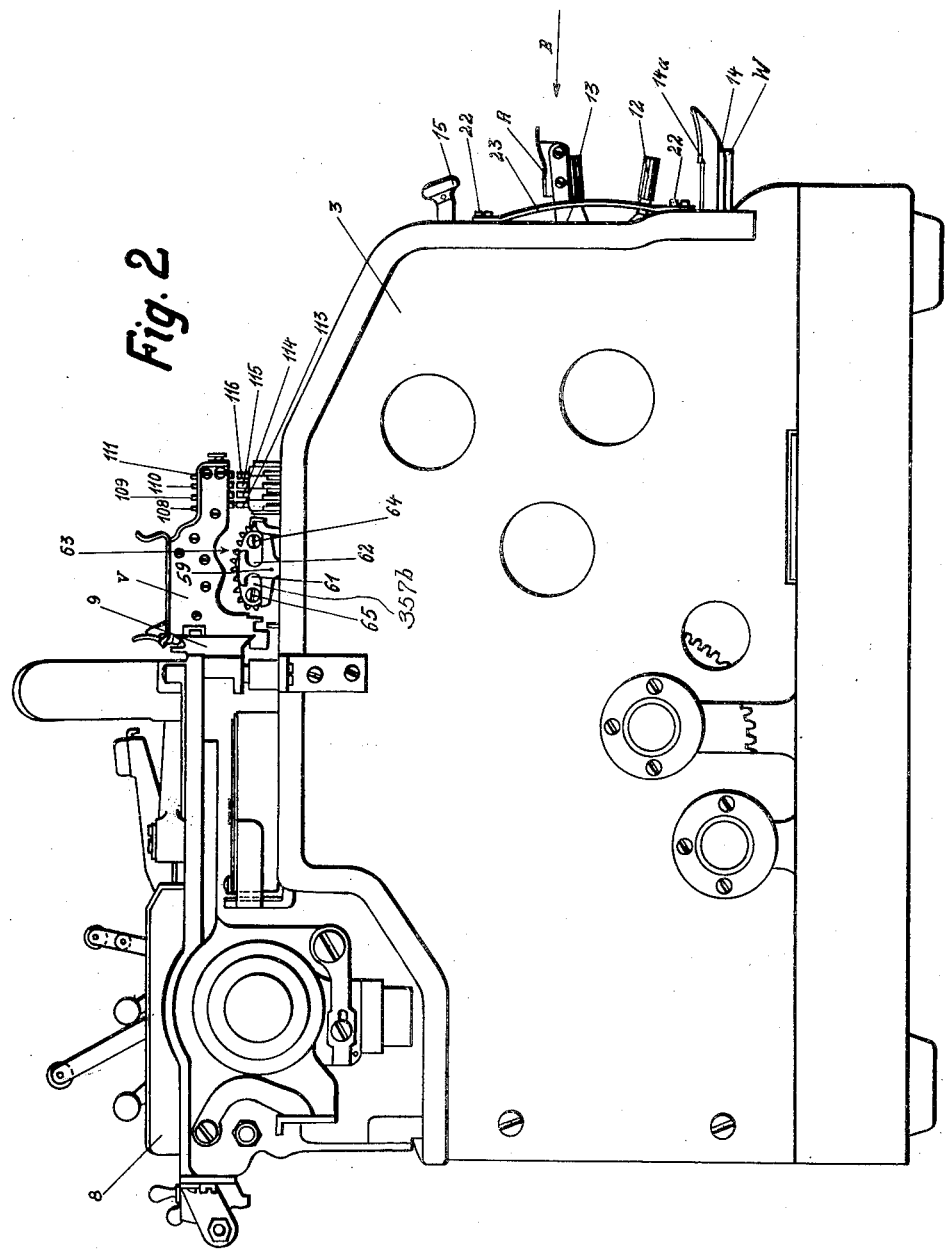
Figure 2 shows a side elevation of Figure 1, viewed in the direction of the arrow "A" in Figure 1.

On the front side of the adding machine, 3, are arranged at the left, two handles, 12 and 13, for setting the column totalizers, V. In this arrangement, the handle 12, (Figures 1 to 3 and 4 to 5a) serves for the setting of the column totalizers V from "disconnected" (disc.) to "addition" (add.) and "subtraction" (sub.) and the handle, 13, (Figures 1, 2, and 6) serves for setting of the column totalizers, V, from "normal" (norm.) to "total" (tot.) and "sub-total" (subtot.). To the right of the two handles, 12 and 13, there is arranged, as is illustrated in Figures 1 and 2, the general change-over key, 14, with locking and release key, 14a, (Figures 3, 4, 4a, 5, 5a, and 9). By the depression of the general change-over key, 14, the type of calculation for which all the totalizers are set, is changed. Above the general change-over key, 14, there is a return key, R, by the depression of which, the stop carriage is brought back into its rest position at the right (seen in Figure 1), whereby the set stops, S₁ (Figure 11) are brought into their zero position. Above the return key, R, is located the disconnecting key, 15, (Figures 1, 2, and 9) which serves for the disconnecting by hand of both cross totalizers, Q and Q₁.

At the right, beside the general change-over key, 14, the repetition key, W, is arranged, by the pressing in of which the action of the return key, R, is rendered inoperative in known manner.

The intermediate wall, 19 (Figure 3) divides the adding machine, 3, into two compartments, in the left hand compartment of which the above-mentioned control levers and their mechanisms with the exception of the repetition key, W, and the return key, R, are located. In the right-hand compartment are arranged the toothed segments 25 (Figure 11) driving the column totalizers, V, and the cross totalizers, Q and Q₁, and the return key, R, together with the repetition key, W.

It may here be remarked that the column totalizers, V, and the two cross totalizers, Q and Q₁, mounted in the adding machine 3 are so arranged in relation to one another that they all can be actuated by one and the same driving sectors, 268, whereby the whole arrangement is extremely simple and compact and the totalizers and the matter printed on the platen, 8x, is readily visible.

It may be mentioned that by the mechanism described the manifold shift operations can be undertaken, which are summarized in detail in the table illustrated in Figure 25. As, however, it would be too extensive a matter to describe the state of operation for all these separate shifts, in the following the method of operation in general will be described only by the aid of one shift series.

Control mechanism for controlling the condition of column totalizer on addition, subtraction and disconnected The lever, 16, (Figures 3, 4, 4a, 5 and 5a) carrying the handle, 12, is pivoted by means of a screw, 17, so as to be swingable on a supporting member, 20b, (Figure 6), which is attached by means of screws, 18, to a supporting member, 20a, which, for its part, is fixed by screws, 18a, to a supporting member, 20. This is fixed by screws, 18b, and 18c, to an intermediate wall, 19, (Figures 1 and 6.)

The handle, 12, (Figure 3) can be displaced in the direction of the arrow "12a" against the action of a spring (not illustrated) located in it. On this movement, the lever, 16, may be adjusted to the desired position and is held in the set position for the time being by the entering of the handle, 12, into round recesses, 21, (Figure 1) of a guide plate, 23, fixed by means of screws, 22, on the front side of the adding machine, 3. The lever, 16, carries at its other end, lugs, 24 and 25, to which pins, 26 and 27, are fixed, and these pins co-act with a control member, 28.

The control member, 28, (Figures 3, 4 to 5a) is pivotally connected by means of a screw, 49, to an angle lever 52, which is swingably mounted at its U-formed part, 50, on a threaded pin, 51, attached to the intermediate wall, 19.

The free end of the angle lever, 52, is in pivotal connection by means of a connecting rod, 53, with an angle lever, 55, (Figure 3) swingably mounted on the threaded pin, 54. The angle lever, 55, at its U-shaped part, 56, is swingably mounted on the threaded pin, 54, fixed in the intermediate wall, 19. To the upwardly directed free limb of the angle lever, 55, is jointed a connecting rod, 57, (Figures 3 and 9) which is jointed by means of a screw, 58, to a fork-lever, 59.

The fork lever, 59 consists of two parts, 59a (Figure 3) and 59b, which are rigidly connected to each other by means of the screws, 58 and 60, which project through short elongated slots (not shown). The purpose of this connection is to permit the length of the fork lever, 59, to be adjusted. The upwardly-directed part, 59b of the fork lever, 59, is provided with recesses, 61 and 62, (Figures 2 and 3) which co-operate with the pins, 64 and 65, (Figure 3) provided on a member 357b of the change-over gear, 63, (Figures 1, 2, 11 to 13 and 22), which pins project to the left (seen in Figure 1) through openings (not shown) in the intermediate wall, 19. The fork lever, 59 (Figure 3) is guided in a supporting member, 59g, which is rigidly mounted by means of screws, 59h, on the intermediate wall, 19, of the adding machine, 3. The lower part, 59a, of the fork lever, 59, is jointed by means of a screw, 66, (Figure 3) to an arm, 67, of a member, 68, (Figure 6a) as described under the heading "Control device for controlling the condition of the column totalizer".

*Operation of the control mechanism for controlling the condition of column totalizer when standing on disconnected*

Figure 3:
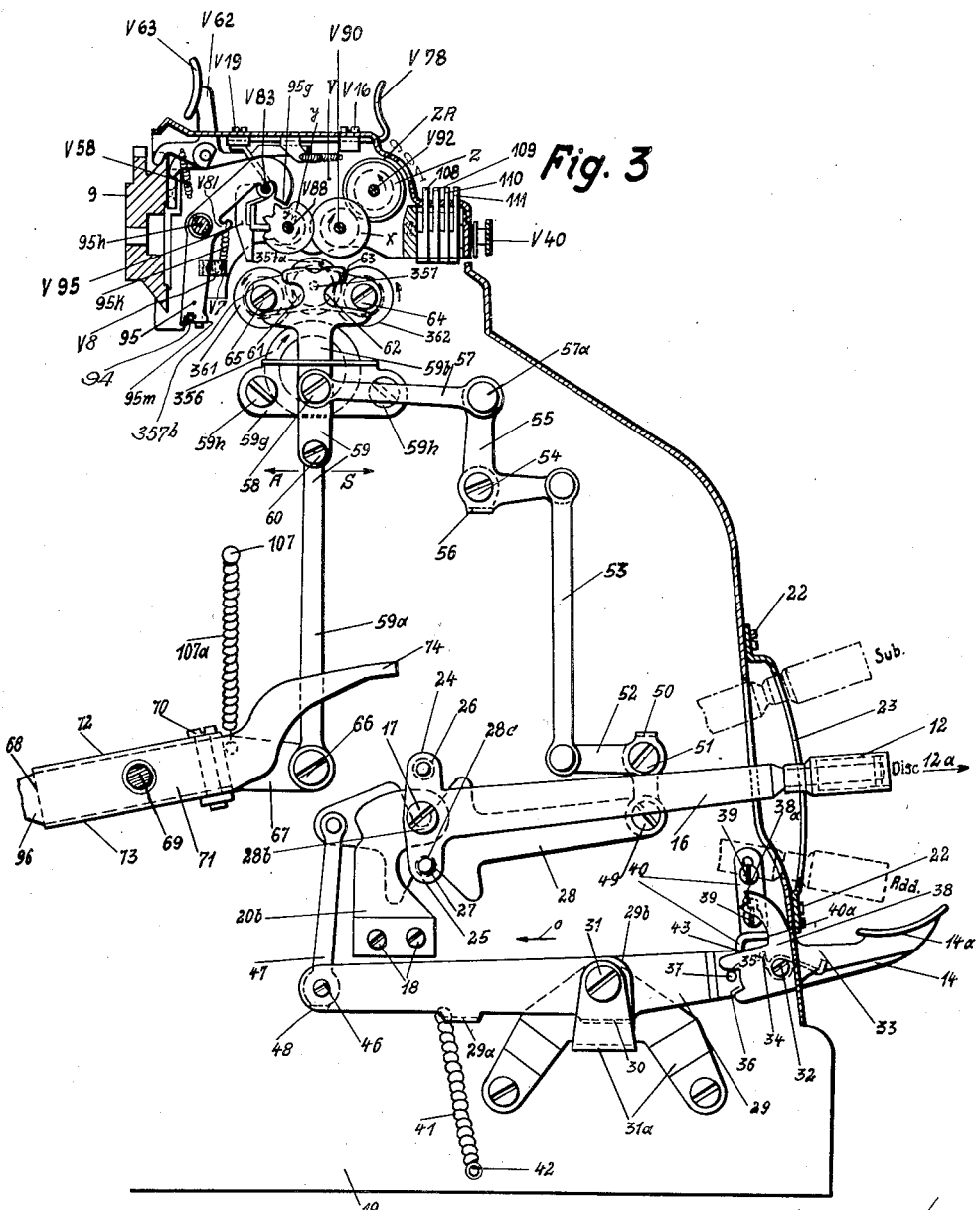
Figure 3 shows the mechanism controlling the column totalizer from "disconnected" to "subtraction" or "addition" the left hand side wall of the machine being omitted to show parts behind the same.

If the lever, 16, (Figure 3) for controlling the column totalizers, V, stands at "disconnected" (disc.) then it, together with its associated mechanisms, take up the position illustrated in Figure 3, in full lines, in which the fork lever, 59, likewise takes up the position as illustrated in Figure 3, by way of the parts, 27, 28, 52, 53, 55, and 57. If, now, through depression of the motor key, 11, the shaft, 106, (Figure 6) makes a single revolution in the anti-clockwise direction, the levers 97, 98, and 99, are acted upon in the anti-clockwise direction and against the action of the torsion springs (not illustrated), by the action of the raised portions of the cams, 103, 104 and 105, which are driven by the shaft, 106, whereby the U-shaped member 71, according to the setting of the lever, 13 (Figure 1), on "normal-total- or sub-total" as described under the heading "Operation of the control device for controlling the condition of column totalizer when the device is shifted on normal", "Operation of the control device for controlling the condition of column totalizer when the device is shifted on total" and "Operation of the control device for controlling the condition of column totalizer when the device is shifted on sub-total", is swung in the clockwise direction (Figure 6) by one of the three levers, 97, 98, 99, and the lever, 67, is also simultaneously swung around its pivot, 69, against the action of the spring, 107a, in the same direction. Herewith the fork lever, 59, (Figure 3) moves vertically downwards and in doing so, moves inoperatively past the pins, 64 and 65, of the change-over gear, 63. The connecting rod, 57, jointed to the fork lever, 59, by means of the screw, 58, is hereby swung around its pivot, 57a, in the anti-clockwise direction without however, acting on any part. Shortly before or at the completion of a revolution of the shaft, 106, the levers, 97, 98, and 99, are returned to their rest position, illustrated in Figure 6, under the action of their torsion springs (not illustrated) and the parts 67, 71, 59, and 57, are likewise returned to their rest position, illustrated in Figure 3, under the action of the spring, 107a.

*Operation of the control mechanism for controlling the condition of column totalizer when standing on addition*

If, a value in the positive direction is to be registered in the column totalizer, V, it is necessary first to set the handle, 12, on "add.", whereby the following mechanisms are operated.

On setting the handle, 12 (Figures 3 and 4) on "add.", the lever 16, is swung round its pivot, 17 out of the position represented in full lines in Figure 3, into the position illustrated in Figure 4 and indicated by "add." Since the pin, 27, of the lever, 16 is in engagement with the recess, 28c, of the control lever, 28, the control lever, 28, is displaced in the direction of the arrow "O" (Figure 4), whereby the lever, 47, is swung round the point, 46, into the position illustrated in Figure 4. Further, the angle lever, 52, is swung round its pivot, 51, in the clockwise direction, whereby the angle lever, 55, is swung by way of the connecting rod, 53, round the screw, 54, in the anti-clockwise direction.

Through this swinging movement of the angle lever, 55, (Figure 3) the fork lever, 59, is swung by way of the connecting rod, 57, round the point, 66, in the anti-clockwise direction, whereby the recess, 61, of the fork lever, 59, moves into engagement with the pin, 65, of the change-over gear, 63.

In this case, let it be assumed that the lever, 13, (Figure 1) is set on "norm." whereby according to Figure 6, the lever 71, 96 is set by way of the parts, 83, 85, and 76, above the lever, 97, of the cam, 103.

If now, the machine is set into operation by depression of the motor key, 11, (Figure 1) whereby the shaft, 106, (Figure 6) is driven in the anti-clockwise direction, all of the cams fixed to the shaft, 106, participate in this rotation.

In the rotation of the shaft, 106, in which the cams, 103, 104 and 105 (Figure 6) take part, the lever, 97, is acted upon in the anti-clockwise direction and against the action of the torsion spring (not illustrated), by the raised portion, 103a, of the cam, 103, (Figure 8). The U-shaped part, 71, (Figure 6) is hereby swung by the lever, 97, in the clockwise direction, whereby the lever, 67, is swung in the same direction round the pivot axis, 69, and against the action of the spring, 107a. The fork lever, 59 (Figure 3) is consequently moved downward and since its recess, 61, is in engagement with the pin, 65, this fork lever swings the change-over gear, 63, in the anti-clockwise direction into the position illustrated in Figure 12, whereby the toothed wheels, 361, move into engagement with the intermediate wheels, 356, and the toothed wheels, 362, of the change-over gear, 63, move into engagement with the toothed wheels, X, located in the column totalizer, V.

Shortly before the completion of a revolution of the shaft, 106 (Figure 6), the cams, 103, 104, and 105, have all arrived in their rest position illustrated in Figure 6, whereby the levers, 97, 98, and 99 under the action of their torsion springs (not shown) and likewise the parts, 71, 68, 67, 59 (Figure 3) and 63, again take up their rest position illustrated in Figure 3.

*Operation of the control mechanism for controlling the condition of column totalizer when standing on subtraction*

If, for all column totalizers, V, generally, all values are to be registered in the negative sense, the lever, 12, (Figure 3), which is set on "addition" (add.) is set on "subtraction" (sub.) whereby the following mechanisms are operated.

If the handle, 12, of the lever, 16, (Figures 1, 2, 3, and 4) is swung out of the position illustrated in Figure 4, into the position illustrated in Figure 5, the control lever, 28, since its recess, 28c, embraces the pin, 27, of the control member, 16, is displaced in the opposite direction of the arrow "O". In this movement, the connecting rod, 47, is swung out of the position illustrated in Figure 4, into the position snown in Figure 5, without, however, having any influence on any of the mechanisms. Further, in the displacement of the control member, 28, in the opposite direction of the arrow "O", the angle lever, 52, is swung around its pivot, 51, in the anti-clockwise direction, whereby the angle lever, 55, (Figure 3) is swung by way of the connecting rod, 53, in the clockwise direction. Hereby, the fork lever, 59, is swung by way of the connecting rod, 57, round its pivot in the clockwise direction, whereby the recess, 61, of the fork lever, 59, moves out of engagement with the pin, 65, of the change-over gear, 63, and the recess, 62, of the fork lever, 59, moves into engagement with the pin, 64, of the change-over gear 63.

If, now, the machine is set in operation by depression of the motor key, 11 (Figure 1), the main drive shaft, 106 (Figure 6) is rotated in the anti-clockwise direction.

In the rotation of the main drive shaft, 106, (Figure 6) in which the cams, 103, 104, and 105 also participate, and the levers, 97, 98, and 99, under the action of the raised portions of the cams, 103, 104, and 105, are swung against the action of their torsion springs (not shown) in the anti-clockwise direction, if the lever 13, (Figures 1 and 6) stands at "normal" (norm.), the raised portion of the cam, 103 (Figure 6) now acts on the roller, 100, of the lever, 97, whereby the latter is swung in the anti-clockwise direction. Hereby, the U-shaped part, 71, is swung in the clockwise direction round the shaft, 69, by the lever, 97, whereby the lever 67 mounted on the member 71 by means of the screw 70 (Figure 3) is swung in the same direction against the action of the spring 107a. The fork lever 59 is consequently moved downwards, whereby since its recess, 62 is in engagement with the pin 64 of change-over gear 63 this lever swings the change-over gear 63 in the clockwise direction from the position illustrated in Figure 3 into the position shown in Figure 13, whereby the toothed wheels, 362 of the change-over gear, move into engagement with the intermediate wheels 356 and the toothed wheels 361 of the change-over gear, 63, move into engagement with the toothed wheels, y, of the column totalizer V.

On the completion of a revolution of the shaft, 106 (Figure 6) all the cams, 103, 104, and 105 have returned into their rest position illustrated in Figure 6 in addition to which the levers 97, 98, and 99, likewise have again returned under the action of their torsion springs (not illustrated) into their position shown in Figure 6.

After swinging of the lever 97 (Figure 6) into its rest position, the member 71 and the lever 67 are also swung under the action of the spring 107a into their rest position, represented in Figure 6 whereby the members 59 and 57 have again taken up their normal position.

*General change over mechanism*

The lever 29 (Figures 3, 4 to 5a, 9 and 9a) which carries the general change-over key 14 is formed as a yoke, 29, 29a and 29b (Figure 9a) and by means of a threaded pin 31 is swingably mounted on a small frame 31a attached to the intermediate wall 19. By means of a screw 32 (Figures 4 to 5a and 9) an angle lever 33 is swingably mounted a short distance in front of the point at which the end of the lever 29 projects from the front wall of the adding machine 3 the angle lever being provided with a key member 14a. The lever 33 is always acted on in the anti-clockwise direction by a torsion spring 34 and rests with the face 35 (Figure 4) of its recess 36 against a pin 37 fixed to the lever 29 whereby its normal position is determined. The upwardly projecting hook shaped limb 38 of the angle lever 33 on the depression of the key 14 is capable of engaging with a member 40 attached to the intermediate wall 19 by means of screws 39, whereby the lever 29 is held in its depressed position (Figure 4a). Under the pull of a spring 41 (Figure 3) which on the one hand engages with the part 29a, of the lever 29 and on the other hand is attached to a pin 42 fixed to the intermediate wall 19, the lever 29 is acted on in the anti-clockwise direction and lies with its upper edge 43 pressing upwards against the member 40 whereby the normal position of the lever 29 is determined.

A pin 46 (Figure 9a) which connects the parts 29 and 29b with one another passes through the U-shaped part 48 of a connecting rod 47 (Figures 9a and 3). The free upwardly-directed end of the connecting rod 47 again is in pivotal connection with the control member 28.

*Operation of the general change over mechanism if control mechanism standing on disconnected*

If the lever 16 is located in the position illustrated in full lines in Figure 3 and the general change-over key 14 is then depressed, the following operations take place. On the depression of the general change-over key 14 the lever 29, 29a, 29b (Figures 3 and 9a) is swung around the pivot 31 against the action of its spring 41 into the position illustrated in Figures 4a and 5a. Herewith, the upwardly projecting hook-shaped arm 38 of the pawl 33 jointed to the lever 29 swings against the face 40a of the member 40 and slides downwards on the same. On the lever 29 being swung further the nose 38a of the pawl 33 snaps below the member 40 under the action of the torsion spring 34 so that the lever 29 is now held fast in its depressed position. Further in the swinging movement of the lever 29 the control member 28 is simultaneously swung by way of the connecting rod 47 (Figure 3) round the point 49 in the clockwise direction, whereby the pin 26 of the lever 16 which is set on "disconnected" is embraced by the recess 28b of the control member 28. Since the pins, 26 and 27, in the "disconnected" position of the lever 16 lie vertically under one another, so the control member 28 on being raised by the change over key 14 in this case, is not displaced so that the parts 52, 53, 55 and 57, which act upon the fork lever 59 are not operated. Consequently, on operation of the motor key 11 (Figure 1) the fork lever 59 (Figure 3) likewise only moves idly up and down without in any way acting on the change-over gear 63. By pressing manually on the key face 14a of the pawl 33 whereby the same is swung in the clockwise direction, and against the torsion spring 34, the nose 38a is released from the member 40 and the parts 29, 29a, 29b, 47 and 28 can return under the action of the spring 41 into their rest position illustrated in Figure 3.

Although on the depression of the motor key 11 (Figure 1) the driving sectors 268 (Figure 11) and other parts have also been actuated, the description of these operations has been omitted here, since as will be evident from the above, in the "disconnected" position of the lever 16 (Figure 3) in any case no transmission to the column totalizer V results irrespective of whether the general change-over key 14 is depressed or not.

*Operation of the general change-over mechanism if control mechanism standing on addition*

It may be assumed that the lever 16 and the parts 28, 52 (Figure 3) 53, 55, 57 and 59 are in addition position in which position said parts take up the position illustrated in Figure 4.

If, now, for any reason, the next value is to be registered in the subtractive sense in one of the column totalizers, V, the general change-over key 14 is moved out of the position according to Figure 4 and into the position according to Figure 4a.

On depression of the general change-over key, 14, the lever 29, 29a, 29b (Figures 4a and 9a) is swung in the clockwise direction round the threaded pin 31 against the action of its spring 41, whereby the lever is held by the pawl 33, 38 in its depressed position. On the swinging movement of the lever 29, 29a, 29b in the clockwise direction, the control member 28 is first of all swung by way of the connecting rod 47 (Figure 3) round the point, 49 in the clockwise direction. As soon as the incline 28e (Figure 4) of the control member 28 strikes against the pin 26 of the lever 16 which is set on "addition", the control lever 28 is displaced in the opposite direction of the arrow "O" and is simultaneously swung round the screw 49 further in the clockwise direction until it takes up its position represented in Figure 4a. Hereby, the pin 26 of the lever 16 moves into the recess 28b of the control member 28. In the movement of the control member 28 (Figure 4a) to the right, the angle lever 52 is swung in the anticlockwise direction, whereby the angle lever 55 is swung by way of the connecting rod 53 (Figure 3) in the clockwise direction. With this the connecting rod 57 moves to the right and hereby swings the fork lever 59 round its pivot point 66 in the clockwise direction, whereby the mouth 61 of the fork lever 59 moves out of engagement with the pin 65 of the change over gear 63 and the recess 62 of the fork lever 59 moves into engagement with the pin 64 of the change over gear 63.

In the revolution of the shaft 106 (Figure 11) which now follows, and in consequence of the depression of the motor key 11 (Figure 1) the fork lever 59 (Figure 3) is acted on downwards by way of the parts 103 (Figure 6) 104 or 105, 97, 98 or 99 and 96, 71, 67, whereby the fork lever 59 takes the pin 64, of the change over gear 63 along with it. Hereby the toothed wheels 362 (Figure 13) of the change over gear 63 move into engagement with the intermediate wheels 356, while the toothed wheels 361 of the change over gear 63 move into engagement with the toothed wheels Y (Figure 13) arranged in the column totalizer V. On the further rotation of the main drive shaft 106 (Figure 11) the toothed wheels 356 are rotationally displaced by way of the parts 277 (Figure 11) 275, 274, 272, 268 and 292 in the backward movement of the toothed segments 292 whereby the value is registered in the negative direction in the column totalizer V by way of the toothed wheels 362 (Figure 13) 357a, 361, Y and X.

After the revolution of the main drive shaft 106 (Figure 6) the parts 103, 104, 105, 97, 98, 99, 71, 67 (Figures 6 and 3) return into their normal position. By pressing on the key 14a (Figure 4a) of the pawl 33 through which the lever 29 is released, the parts 29, 47 and 28, take up again their position illustrated in Figure 4.

*Operation of the general change over mechanism if control mechanism standing on subtraction*

It may be assumed that the lever 16 and the parts 28, 52 (Figure 3) 53, 55, 57 and 59 are in subtraction position in which position said parts take up the position illustrated in Figure 5.

If now for any reason, a selected value is to be registered in the additive sense in one of the column totalizers, V, the general change-over key 14 (Figure 5) is depressed, whereby the lever 29, 29a, 29b (Figures 5 and 9a) is swung round the threaded pin 31 in the clockwise direction against the action of the spring 41 and takes up the position illustrated in Figure 5a. Hereby, the lever 29 is held in this position by the pawl 33.

In the swinging movement of the lever 29, 29a, 29b in the clockwise direction, the control member 28 first of all is swung by way of the connecting rod, 47, (Figure 5) round the point 49 in the clockwise direction. As soon as the incline 28f of the control member 28 presses against the pin 26 of the lever 16 which is in the subtraction position, the control member 28 is displaced in the direction of the arrow "O" (Figure 5) and is simultaneously swung further round the point 49 in the clockwise direction until it takes up the position illustrated in Figure 5a, in which the pin 26 of the lever 16 has entered the recess 28b of the control member 28. In displacing the control member 28 in the arrow direction "O" the angle lever 52 is swung in the clockwise direction whereby the angle lever 55 is swung by way of the connecting rod 53 (Figure 3) in the anticlockwise direction. Consequently, the fork lever 59 is swung by way of the connecting rod 57, out of the position into which it has been swung in the clockwise direction, in the anticlockwise direction, whereby the recess 62 of the fork lever 59, moves out of engagement with the pin 64 of the change-over gear 63 and the recess 61 of the fork lever 59 moves into engagement with the pin 65 of the change over gear 63.

In the rotation of the main drive shaft 106 (Figure 6) in the anti-clockwise direction, which now follows in consequence of the depression of the motor key 11 (Figure 1), the fork lever 59 (Figure 3) is acted on downwardly by way of the parts 103, 97, 96, 71 and 67, whereby, as it is now in engagement with the pin 65 of the change over gear 63 it swings the change over gear 63 out of the position according to Figure 3 into the position according to Figure 12, whereby the toothed wheels 361 of the change over gear 63 move into engagement with the intermediate wheels 356 while the toothed wheels 362 of the change over gear 63 move into engagement with the toothed wheels X of the column totalizer V. Immediately thereon in the further rotation of the shaft 106 (Figure 6) the toothed segments 292 are acted on by way of the parts 277 (Figure 11) 275 and 272, in the anti-clockwise direction, whereby the value is registered in the positive sense in the column totalizer V by way of the toothed wheels 356, 361 (Figure 12) 357a, 362 and X.

After one revolution of the driving shaft 106 the parts 103, 104, 105, 97, 98, 99, 71, 67, 59 (Figure 3) have again taken up their rest position. After depression of the key 14a (Figure 5a) whereby the lever 29, 29a, 29b is released, the parts 47 and 28, move out of the position illustrated in Figure 5a and return again into the position shown in Figure 5, in which the totalizers V are again driven in the subtractive direction.

*General change over mechanism for controlling the state of calculation of cross totalizer Q*

From a consideration of Figure 9a, it will be evident that on depression of the general change over lever, 29—29a—29b, by way of the member 209 jointed to it, the state of calculation of the cross totalizer Q likewise is capable of being changed at will.

*General change over mechanism for controlling the state of calculation of cross totalizer $Q_1$*

From a consideration of Figures 9b and 9a, it is readily appreciated that on depression of the general change-over member 29, 29a, 29b by way of the member 151 the state of calculation of the cross totalizer $Q_1$ likewise can be changed.

*Control device for controlling the condition of the column totalizer*

A member 68 is swingably mounted on a shaft 69 (Figures 3 and 6) which is mounted so as to be incapable of rotation in the left-hand side wall and on the intermediate wall 19 of the adding machine 3.

A U-shaped member 71 (Figures 3, 6 and 6a) is swingably mounted on the member 68 by means of a screw 70 whereby the two limbs 72 and 73 of the member 71 embrace the member 68. The hole in the member 71, through which the shaft 69 projects is greater than the diameter of the shaft 69. An arm, 74 formed on the member 71 engages in a slot 75 (Figure 6) of a slide 76 which is guided by means of its teeth 76a and 76b, in corresponding slots (not illustrated) in the intermediate wall 19.

The member 68 (Figure 3) is therefore swingable on the shaft 69 in the vertical direction. The member, 71 participates in the swinging movement. However, as the limbs 72 and 73 of the member 71 embrace the member 68 and as these members are jointed by means of the screw 70, the member 71 can be swung in relation to the member 68 likewise in the horizontal direction. The slot 75 (Figure 6) of the slide 76 is of such length that the arm 74 of the member 71 on swinging in the vertical direction does not move out of engagement with the slide 76.

An arm 96 of the member 71 (Figure 6) directed towards the rear side of the machine, is capable of coacting with three levers 97, 98, 99 (Figures 6, 7 and 8) swingably mounted on a shaft (not illustrated) mounted in the left-hand side wall and in the intermediate wall 19 of the adding machine 3. The levers 97, 98 and 99, consist each of two levers 97a, 97b, 98a, 98b and 99a, 99b (Figure 8) which are connected with one another by means of bridges 97c, 98c, 99c and 97d, 98d, 99d. Between each of the levers, 97a, 97b, 98a, 98b and 99a, 99b, there is rotatably mounted a roller 100, 101 and 102, which coact with cams 103, 104 and 105, which are nonrotatably mounted on the main drive shaft 106 (Figure 6) of the machine and are connected with the intermediate cams 253 (Figure 8) and 254 to form a whole. In this arrangement the cam 103 is designed for the normal position (norm.), the cam 104 for taking the total (tot.) and the cam 105, for taking the sub-total (sub-tot.). To the arm 67 (Figures 3 and 6) of the member 68 is connected a spring 107a which at its other end, engages with a pin 107 which is rigidly fixed in the left-hand side wall and in the intermediate wall 19 of the adding machine 3. By this spring, the parts 68 and 71 are acted upon in the anti-clockwise direction, so that the arm 96 of the member 71 is always held in contact with one of the three levers 97, 98, and 99, whereby the normal position of the members 68 and 71, is determined. The levers 97, 98, and 99 are acted upon in the clockwise direction by torsion springs (not illustrated) whereby their rollers 100, 101, and 102, are held in contact with the corresponding cams 103, 104, and 105. The operation of the control device for controlling the condition of the column totalizer may be clearly understood from the drawings and the single sub-headings, a description of the operation will not, therefore, be given.

*Control device for controlling the condition of column totalizer on normal, total and subtotal*

On the supporting member 20a (Figure 6) there is swingably mounted, by means of a screw 79 a lever 80 which carries the handle 13 on its free end which projects out through the front wall of the machine. This handle is displaceably arranged on the lever 80 in a similar manner to that of the handle 12 on the lever 16 so that the handle 13 after setting from "normal" (norm.) to "total" (tot.) or "sub-total" (sub-tot.), is capable at times of entering into one of the recesses 81 (Figure 1) of the guide plate 23 and in this manner the lever 80 is held in its set position for the time being.

A connecting rod 83 (Figure 6) is jointed to the lever 80 by means of a screw 82 and this connecting rod is jointed at its other free end by means of a screw 84 to an angle lever 85. This is swingably mounted at its U-shaped part 86 on a shaft 121 which is mounted in a U-shaped supporting member 123 attached to the intermediate wall 19 by means of a screw 124. The downwardly directed limb of the angle lever 85 is in pivotal connection by means of a screw 89 with the slide 76.

Further, a two armed lever 90 (Figure 6) which is swingably mounted at the point, 89a is connected with the angle lever 85 by means of the screw 84 and the other free end of the lever 90 is in pivotal connection with a twisted connecting rod 91a. The latter, again, is jointed to a yoke 92—93a—93b, which is swingably mounted in the points, 93 and its bridge 93a is capable of engaging in a slot 94 of the tens transfer lever 95. This arrangement has for its purpose to prevent the tens transfer lever 95 from swinging out on taking a total.

Operation of the control device for controlling the condition of column totalizer when the device is shifted on "normal"

First, let it be assumed that the knob 13 (Figures 1 and 6) is set on "normal", in which case, the parts 80, 83, 85, 76, 71 take up the position illustrated in Figure 6. Further, let it be assumed, that the lever 16 (Figure 3) stands at "disc." whereby it and the parts, 27, 28, 52, 53, 55, 57 and 59, in connection with it, take up the position represented in Figure 3.

If now, the motor key 11 (Figure 1), is operated, the shaft 106 (Figure 6) is rotated in the direction of the arrow, in which revolution, the cams 103, 104 and 105 participate. The action of the two latter will not be described at present, as this action will be described in detail in the operations still to be described. During the first half of the revolution of the cam, 103, no mechanisms are operated, since the roller 100 (Figure 8) has started on the lower portion of the cam 103 as soon as the roller 100 runs up on to the raised portion of the cam 103 which is the case in the second half of the cam's revolution, so the part 97 is swung round the pivot, 97r in the anti-clockwise direction against the action of a torsion spring (not illustrated). Since the part 97d of the member 97, hereby acts on the part 96 (Figure 6) of the lever 71, the lever 71 and consequently the member 68 also are swung against the action of the spring 107a engaging with the latter in the clockwise direction, whereby the fork lever 59 (Figure 3) moves downwards, without, however, acting on one of the pins 64 and 65, of the change over gear 63, so that therefore, no transference of a value can take place into one of the column totalizers V (Figures 1 and 3).

If on the contrary, the lever 16 (Figure 3) stands at "addition" (add.) in which case the parts 27, 28, 52, 53, 55, 57, 59, take up the position illustrated in Figure 4, or if the lever 16 stands on "subtraction" (sub.) (Figure 5) in which case the said parts take up the position illustrated in Figure 5, if the lever 80 (Figure 6) stands at "normal", the set value is registered in the column totalizer V which is directly in the working position and in the additive or subtractive sense on the second half of the revolution of the cam 103 (Figure 8). It is evident, without further explanation that if the roller 100 again moves off from the raised portion of the cam 103 then the parts 97, 71 (Figure 6), 68, 59 (Figure 3) return into their rest position under the action of the torsion spring (not illustrated) engaging with the lever 97 and of the spring 107a.

In other words, if the knob, 13, is set on "norm." the sectors 268 (Figure 11) first move idly in the clockwise direction. When this movement ends, the engagement of the change-over gear 63, results and according to whether the knob 12 (Figure 4) stands at "add." or "subtr." the engagement of the change over gear is effected according to Figure 12 or according to Figure 13. Hereupon, the sectors 268 (Figure 11) are brought back in the anti-clockwise direction into their rest position, whereby the value is registered in the column totalizer V concerned.

Operation of the control device for controlling the condition of column totalizer when the device is shifted on "total"

If, a total is to be taken, the knob 13 is set on "total" (tot.) whereby the lever 80 (Figure 6) swings round the screw 79 in the anti-clockwise direction into the position shown in dotted lines in Figure 6. By this swinging movement of the lever 80 the connecting rod 83 is acted upon in the arrow direction "P" indicated in Figure 6, whereby the angle lever 85 is swung round the pin 121 in the anti-clockwise direction. The slide 76 jointed to the downwardly projecting limb of the angle lever 85, hereby moves to the right, whereby owing to the part 74 of the lever 71 projecting into the slot 75 of the slide 76 this lever is swung round the screw 70 in the direction of the arrow "Q". Hereby, the part 96 of the lever 71 slides away from the part 97d of the lever 97 and rests on the part 98d of the lever 98.

Besides, insofar as this has not happened, the lever 16 (Figure 3) is to be swung out of the position (disc.) shown in full lines in Figure 3, into the position (add.) shown in dotted lines in Figure 3, whereby the pin 65 of the change-over gear 63 is embraced by the recess 61 of the fork lever 59.

On the displacement of the connecting rod 83 (Figure 6) in the direction of the arrow "P", the two-armed lever 90 is swung in the clockwise direction round the point 89a (Figure 6), whereby the yoke, 92, 93a—93b is likewise swung by way of the connecting rod 91a in the clockwise direction round the point 93 whereby its bridge 93a enters the recess 94 of the tens shift levers 95 and in this manner prevents any swinging movement of these levers.

On depression of the motor key 11 (Figure 1) the shaft 106 (Figures 6 and 11) is rotated in the anti-clockwise direction, in which rotation the cam 104 also participates. Immediately at the commencement of the rotation the roller 101 (Figure 8) moves on to the raised part of the cam 104, whereby the lever 98 is swung round its pivot 98r in the anti-clockwise direction against the action of a torsion spring (not illustrated). In this movement the part 98d of the lever 98 acts on the part 96 (Figure 6) of the lever 71, and swings the latter in this manner round its pivot 69 in the clockwise direction and against the action of the spring, 107a, engaging with the part 67 whereby the fork lever, 59 (Figure 3) moves downwards. Since the recess 61 of the fork lever 59 (Figure 3) embraces the pin 65 of the change over gear 63, the latter is swung round its pivot 357 in the anti-clockwise direction whereby the toothed wheels 361 (Figure 12) of the change-over gear 63 move into engagement with the main drive wheels 356 and the toothed wheels 362 of the change-over gear, move into engagement with the intermediate wheels, X, in the column totalizer V. Simultaneously, the toothed wheels 361, 357a and 362 located in the change over gear 63 are unlocked and likewise the wheel sets "Y" of the column totalizer V by means of the lever 366 and the flap 95 (Figure 11).

In the further rotation of the main drive shaft, 106 (Figures 9 and 11) in the anti-clockwise direction, the rollers 275 move from the raised part of the cams, 277, on to the lower part of the same, whereby the levers, 272 are swung in the clockwise direction. In this swinging movement the driving sectors 268 participate and also the toothed segments 292, 293, 294, swingably mounted on them. The driving sectors 268 are now swung until the cams, Yn, on the toothed wheels Y (Figure 11) are held by the noses 95g of the levers 95 which are prevented from swinging by the yoke 92—93a—93b (Figure 6). After one-half of a revolution of the main drive shaft 106, all of the cams Yn, of the toothed wheels Y of the appertaining column totalizer V located in the operative position, rest against the noses, 95g, of the levers 95 in which position the number rollers ZR of the column totalizer V, show zero in the inspection aperture and all of the driving sectors 268 are swung in the clockwise direction correspondingly to the value contained in the column totalizers. Consequently, the corresponding printing rods T (Fig. 23) have also been raised by way of the arms 269 of the sectors 268.

Immediately upon this, the value which before taking the total was registered in the column totalizer V is brought to impression on the platen Sx (Figure 23) by the hammer mechanism described under the heading "Operation of the printing mechanism".

Now, after one-half of a revolution of the main drive shaft 106 (Figure 8) the roller 101 of the lever 98 moves down from the raised part of the same, whereby the lever 98 is swung round its pivot 98r in the clockwise direction. Consequently, the lever 71 (Figure 6) is swung round the point 69 in the anti-clockwise direction under the action of the spring 107a whereby the lever 59 (Figure 3) which is jointed to the member 67 moves upwards and the change over gear 63 is disengaged from the main drive wheel 356 and from the toothed wheel X of the column totalizer V. Hereby the left-over sectors 268 are then held against the action of the springs T1 (Figure 23) engaging with the printing rods T in their positions for the time being by a lock (not shown since it forms per se no part of the present invention) which falls into a set of teeth F (Figure 23) on the feeler rods, U.

As soon as the change over gear 63 (Figure 11) has taken up its rest position shown in Figure 11, the face 277a of the cam 277 acts on the rollers 275 of the levers 272 whereby the driving sectors 268 are swung back into their rest position, with which the mechanisms have taken up their normal position again and the total taking is completed.

*Operation of the control device for controlling the condition of column totalizer when the device is shifted on "sub-total"*

In taking a sub-total from a column totalizer, V, the lever 80 (Figure 6) is first moved into the position indicated in Figure 6 by dotted lines. Hereupon, the connecting rod 83 is displaced in the direction of the arrow "P", whereby the angle lever 85 is swung round the pin 121 in the anti-clockwise direction. The slide 76 jointed to the angle lever 85 at the point 89 is hereby displaced to the right, whereby the lever 71 projecting into the recess 75 of the slide is swung round the screw 70 in the direction of the arrow "Q". The member 96 hereby slides on the U-shaped part 99d.

In swinging the lever 80 (Figure 6) the two-armed lever 90 which is jointed at the point 84 to the connecting rod 83 is acted upon round the point 89a, in the clockwise direction, whereby the yoke 92—93a—93b is acted on, by way of the connecting rod, 91a, likewise in the clockwise direction. With this, the bridge 93a of the yoke 92—93a—93b, likewise moves into engagement with the slots, 94 of the tens shift levers 95 which is possible without difficulty, since the length of the slots 94 of the levers 95 is adapted to the swinging movement of the bridge 93a of the yoke 92—93a—93b. The levers 95 are consequently locked.

It may be remarked, that the lever 16 (Figure 4) or the knob 12 as in total-taking must likewise be set for addition.

If, now, the motor key 11 (Figure 1) is depressed so the motor contact is closed, and the main drive shaft, 106 (Figure 11) rotates in the direction of the arrow "K", in which rotation in addition to all the remaining cams, the cam, 105 (Figure 8) also participates. Immediately at the commencement of the rotation of the cam 105 the roller 102 of the lever 99 moves on to the raised part of this cam, and hereby swings the lever 99 round its pivot 99r in the anti-clockwise direction and against the action of a torsion spring (not illustrated). The U-shaped part 99d of the lever 99 consequently acts on the part 96 (Figure 6) of the lever 71 and swings the same as well as the member 68 in the clockwise direction against the action of the spring 107a which engages with the part 67. The fork lever 59 (Figure 3) jointed to the part, 67, hereupon moves downwards and, since its recess, 61, embraces the pin 65 of the change-over gear 63, the fork lever 59 swings the change-over gear 63 round the pivot 357 (Figure 11) in the anti-clockwise direction whereby the toothed wheels 362 (Figure 12) of the change-over gear 63 move into engagement with the intermediate wheels X of the column totalizer V located in the working position, and the toothed wheels 361 of the change-over gear 63 move into engagement with the main drive wheels 356. Simultaneously, the toothed wheels 361, 357a and 362 in the change-over gear 63 are locked.

As soon as the change-over gear 63 is brought into the working position, the rollers 275 (Figure 11) of the yoke 272—271—272 move off from the raised part of the cams 277 on the further rotation of the main drive shaft 106, whereby the yoke 272—271—272 is swung in the clockwise direction. Since the parts 268d of the driving sectors 268 (Figure 11) rest against the bridge 271 under the action of the springs T1 (Figure 23) engaging with the type printing rods, T, these driving sectors participate in the swinging movement in the clockwise direction. They are, however, only swung until the cams, Yn (Figure 11) of the toothed wheels Y of the column totalizer, V, strike against the noses 95g of the levers 95, whereby the number rollers ZR of the column totalizer V move to zero. The individual driving sectors 268 are therefore only swung correspondingly to the amount which was registered in the column totalizer V and which was visible in the inspection aperture of the column totalizer V, before the commencement of the operation of the machine. This value is now brought to impression on the platen Sx (Figure 23) by the hammer mechanism, described under the heading "Operation of the printing mechanism".

The change over gear 63 remains also in the working position in the second half of the revolution of the main drive shaft 106 (Figure 11) i. e. it is not, as in total-making, swung back into the rest position, since the cam, 105 (Figure 8) has only a depression in the zero position.

After the value has been printed, the rollers 275 (Figure 11) of the yoke 272—271—272 again move from the lower portion of the cam 277 on to the raised portion thereof, whereby the driving sectors 268 and the toothed segments 292—293 and 294 are swung in the anti-clockwise direction, since, the change-over gear 63 is still in the operative position, the number rollers ZR are again rotated correspondingly to the former written-out value in the positive direction, whereby this value is again registered on the number rollers ZR.

As soon as the driving sectors 268 (Figure 11) have taken up their rest position, which is the case when the rollers, 275 of the yoke 272—271—272 are located on the raised portion of the cam discs, 277 the roller 102 (Figure 8) of the lever 99 moves from off the raised portion of the cam 105 into the depression of the same, whereby the lever 99 is swung round its pivot 99r in the clockwise direction under the action of its torsion spring (not illustrated). Hereupon, the lever 71 (Figure 6) is swung in the anti-clockwise direction under the action of the spring 107a which engages with the member 67. In this manner, the fork lever 59 (Figure 3) which is jointed to the member 67 is displaced upwardly, since the member 68 is embraced by the U-shaped member 71. By the upward displacement of the fork lever 59 the change-over gear 63 is swung into its normal position since the pin 65 of the same is embraced by the recess 61 of this fork lever 59, whereby the toothed wheels 361 of the change-over gear 63 move out of engagement with the main drive wheels 356 and the toothed wheels 362 of the same, move out of engagement with the toothed wheels X of the column totalizer V, whereupon all the mechanisms have again taken up their rest position and the calculating operation is completed.

*Change over gear for the column totalizers*

The toothed segments 292 engage driving wheels 356 (Figures 11, 12, and 13) rotatably mounted on the shaft 355 rigidly fixed in the right hand side wall, Sr, and in the intermediate wall of the adding machine 3.

On a shaft 357 (Figures 11, 12 and 13) rotatably mounted in the right-hand side wall, Sr, and in the intermediate wall 19 of the adding machine 3, two plates, 358 and 359 (Figure 1) are rigidly mounted. On the shafts 360 and 360a, rigidly mounted in the two side walls, 358 and 359, of the change-over gear, 63, and also on the shaft 357, there are a number of toothed wheels 361, 362 and 357a, rotatably mounted. The number of these toothed wheels, which engage with one another, is the same as that of the driving sectors 268 (Figure 11).

As is obvious from what has been above described, the side walls 358 and 359, form with the wheel sets, 361, 357a and 362, a common frame which is swingable on the shaft 357. To the left of the side plate 359 (Figure 1) a member 357b is fixed on the rotatable shaft 357 and this member carries the pins 64 and 65 (Figures 1, 3 and 11) which project out through openings (not illustrated) in the intermediate wall 19 and in this manner are capable of co-acting with the recesses 61 and 62 of the fork lever 59 (Figure 3).

The right hand side wall, 358, (Figures 11, 12 and 13) has a recess 364 with which co-acts a roller 369 which is mounted on an angle lever 366. The angle lever 366 is acted on in the clockwise direction by a spring 368 connected between its limb, 366a and a pin 367, whereby in the case where the roller 369 lies in the recess 364 the change-over gear 63 is held in its middle position as is evident from Figure 11. The lever 366 is swingably mounted on the shaft 304 (Figures 11 and 12) and on the swinging of the change-over gear 63 into the position illustrated in Figure 12 or 13, this lever is capable by means of its part 366b (Figure 11) of swinging in the unlocking direction the locking flap V 95 (Figs. 3a and 11) arranged in the column totalizer V for the wheel set Y of the column totalizer V.

On the right-hand side part 358 of the change-over gear 63 (Figures 11, 12 and 13), a lever 372 formed to correspond to Figures 11 and 12 is swingably mounted by means of the screw 371 and this lever by means of the bridge 373 is rigidly connected with a lever 374 which is likewise swingably mounted on the screw 371. The angularly bent and tooth like part 375 of the bridge 373 is capable of engaging in the tooth spaces of the toothed wheel 362 arranged in the change-over gear 63 and in this manner lock the toothed wheels 362, 357a and 361. By means of the spring 378 (Figures 12 and 13) which, on the one hand, engages with the bridge 373 and, on the other hand is connected to a pin 377 arranged on the right hand side plate 358 of the change over gear frame, the locking yoke, comprising the levers 372 and 374 and the bridge 373 is held with its tooth-shaped part 375 in engagement with the tooth spaces of the toothed wheels 362 of the change over gear 63 in the case where this is located in its middle position illustrated in Figure 11. The face, 379, of the lever 372 (Figure 13) is capable of co-acting with the pin 380 fixed to the side wall Sr while the face 381 of the lever 372, (Figure 12) is capable of co-acting with the pin 382 fixed to the side wall Sr.

*Operation of the change over gear, when control mechanism is set on disconnected*

If the lever 16 (Figure 3) for controlling the column totalizers V stands at "disconnected" (disc.) then it, together with its associated mechanisms, takes up the position illustrated in Figure 3, in full lines, in which the fork lever 59 likewise takes up the position as illustrated in Figure 3.

If now the lever 59 (Figure 3) is moved vertically downwards as described under the heading "Operation of the control mechanism when standing on disconnected", the same moves inoperatively past the pins 64 and 65 of the change-over gear 63, so that the change over gear remains in its normal position.

*Operation of the change-over gear, when control mechanism is set on addition*

If the fork lever 59 is preset on addition and moved downwardly as described under the heading "Operation of the control mechanism for controlling the condition of column totalizer when standing on addition" the fork lever 59 swings the change over gear 63 in the anti-clockwise direction into the position illustrated in Figure 12, whereby the toothed wheels 361 move into engagement with the intermediate wheels 356 and the toothed wheels 362 of the change-over gear 63 move into engagement with the toothed wheels X located in the column totalizer V.

In swinging the change over gear 63 (Figure 12) into the addition position, the face 381 of the lever 372, pushes against the pin 381 rigidly fixed in the machine housing, whereby the lever 372 is swung round its pivot, 371 in the clockwise direction, against the action of the spring 378 in which swinging movement the lever 374 and the bridge 373 connecting the two levers 372 and 374 also participates, whereby the tooth shaped part 375 of the bridge 373 moves out of engagement with the toothed wheels 362 of the change over gear 63 and in this manner the toothed wheels 361, 357a and 362 of the change over gear 63 are unlocked.

In swinging the change-over gear 63 the locking lever 366 which holds the change-over gear in its inoperative position, is swung against the action of the spring 368 out of the position illustrated in Figure 11 and into the position illustrated in Figure 12, whereby the roller 369 moves out of the recess 364 of the change over gear 63 on to the raised part 363 of the change over gear.

As soon as the wheels 361 of the change over gear 63 have moved into engagement with the intermediate wheels 356 and the toothed wheels 362 of the change over gear 63 have moved into engagement with the toothed wheels X located in the column totalizer V, the gradually rising face 277a (Figure 11) of the cams 277 act on the rollers 275 of the levers 272, whereby the same are swung in the anti-clockwise direction. With this the bridge 271 connecting the two levers 272 takes the driving sectors 268, after one another according to the set value in addition to which, the toothed segments 292 swingably mounted on them at the point 289 are swung likewise in the anti-clockwise direction, since they are held by means of the springs 295 against the projections D59 of the driving sectors. In this swinging movement of the driving sectors 268 swung out to correspond to the set value, the toothed wheels 361, 357a and 362, are rotated in the direction of the arrows indicated in Figure 12, whereby the value by means of the wheels Y are transferred in a positive sense to the number rollers ZR of the totalizer V positioned over the sectors.

Shortly before the completion of a revolution of the shaft 106 the change over gear 63 is again restored to its normal position through the intermediary of the parts 103, 97, 71, 78, 67 and 59.

*Operation of the change-over-gear, when control mechanism is set on subtraction*

If the fork lever 59 is preset on subtraction and moved downwardly as described under the heading "Operation of the control mechanism for controlling the condition of column totalizer when standing on subtraction" the fork lever 59 swings the change-over gear 63 in the clockwise direction from the position illustrated in Figure 3, into the position shown in Figure 13, whereby the toothed wheels 362 of the change-over gear move into engagement with the intermediate wheels 356 and the toothed wheels 361 of the change-over gear 63 move into engagement with the toothed wheels Y of the column totalizer V.

In the swinging movement of the change-over gear, 63, into the subtraction position illustrated in Figure 13 the face 379 of the lever 372 pushes against the pin 380 rigidly mounted in the machine housing, whereby the lever 372 together with the lever 374 connected to it by the bridge 373 are swung round the points 371 against the action of the spring 378 in the clockwise direction. Hereby, the tooth-shaped part 375 of the bridge 373 moves out of engagement with the toothed wheels 362 of the change-over gear 63 whereby the toothed wheels 362, 357a and 361 of the change-over gear 63 are unlocked.

Further, in the swinging movement of the change-over gear 63 (Figure 13) the locking lever 366 which holds the same in the rest position, has been swung round its pivot 304 against the action of its spring 368 whereby the roller 369 moves out of the recess 364 of the change-over gear 63 on to the raised portion 363a of the same, whereby the upper end 366b of the lever 366 swings the flap V95 (Figure 11) mounted in the totalizer, V in the clockwise direction and thereby unlocks the wheels Y, X, and Z.

The toothed segments 292 now rotate the intermediate wheels 356 corresponding to the set value whereby the toothed wheels 362 (Figure 13) 357a, 361, Y and X are rotated correspondingly to the arrow directions indicated in Figure 13 whereby the value is registered in the column totalizer V and in the negative sense.

Shortly before the completion of a revolution of the shaft 106 the change over gear 63 is again restored to its normal position through the intermediary of the parts 103, 97, 78, 67 and 59.

*Column totalizer*

Figures 3A, 3B, 3C:
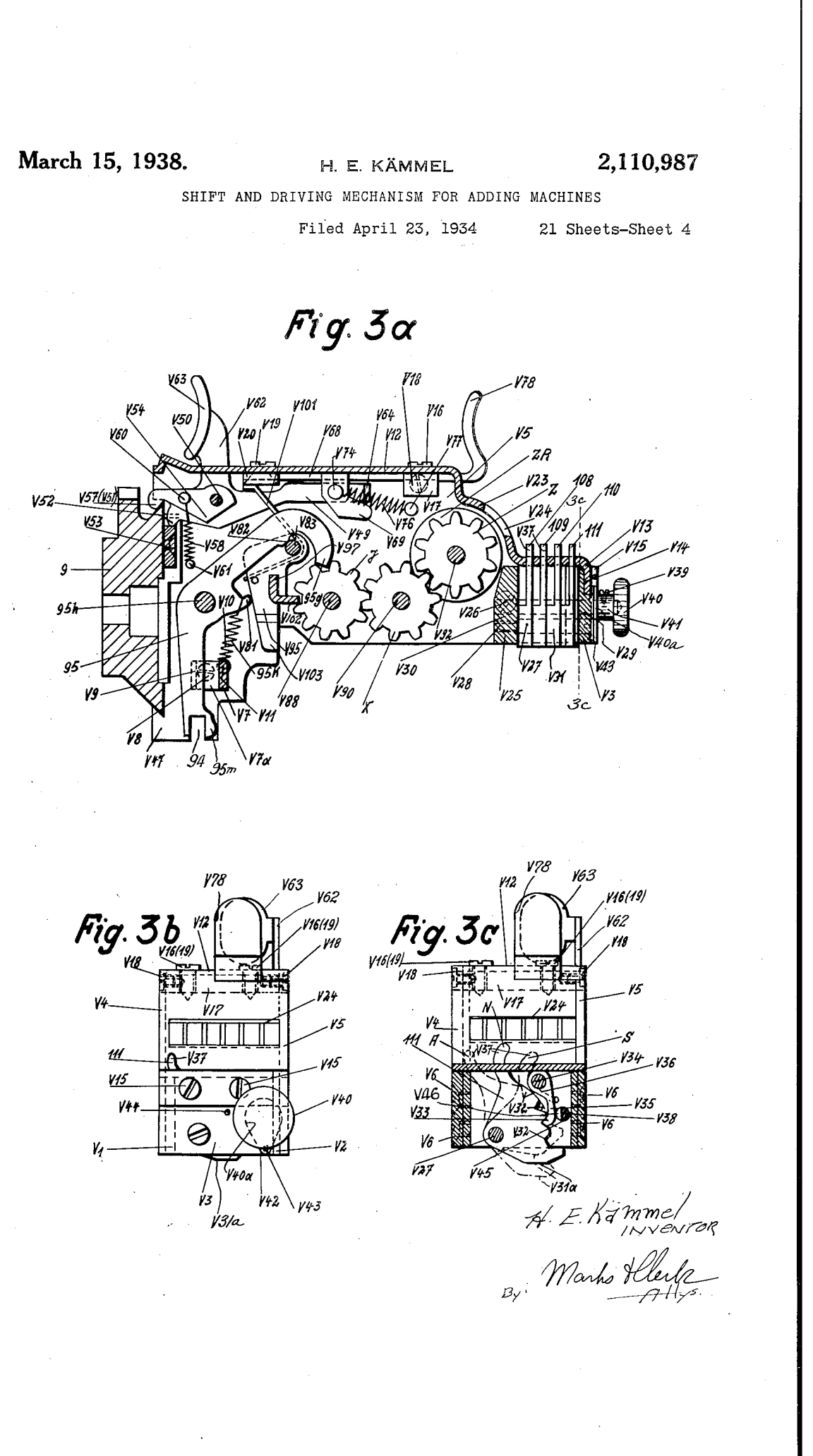

To the limbs V1 and V2 (Figures 3b and 3c) of the U-shaped front wall V3 (Figures 3a and 3b) of the column totalizer or register, the two side walls V4 and V5 are secured by means of the screws V6 (Figure 3c). The two side walls, V4 and V5, are also secured by the U-shaped spacing piece V7 (Figure 3a) to the arms V7a of which (in Figure 3a only the right arm is shown), the side walls V4 and V5 are attached by means of the screws V8. The arms V7a of the spacing piece V7 are bent outwards at their free ends at right angles, and the parts V9, so bent over, engage in slots (not shown) formed in the side walls. The spacing piece V7 is thus prevented from making any undesirable rotational movements about the screws V8 by the tension of the springs 95k, which are attached to the holes V11 of the distance piece V7 and the result of which movements would be to prevent the springs 95k, acting with sufficient force upon the tens transfer levers 95. The cover plate V12 of the column totalizer V which is of the shape shown in Figure 3a, has its front portion, V13, bent over downwards at a right angle. The portion V13 is disposed in the cut away portion V14 of the front wall V3, so that the outer face of this portion of the cover plate V12 lies flush with the front wall V3. The cover plate V12 is fastened to the front wall V3 by means of the screws V15 (Figures 3a and 3b). Furthermore, the cover plate V12 is fastened by means of the screws V16 (Figures 3a, 3b and 3c) to the spacing piece V17 which in its turn is secured by means of the screws V18 (in Figure 3a only the right-hand screw is shown) to the side walls V4 and V5 of the column totalizer V. The cover plate V12 is also secured to the part V20 (Figure 3a) by means of the screws V19. The ends V21 and V22 (Figure 3d) of the part V20, are of dove-tail formation and fit with these dove-tail parts into correspondingly shaped holes in the side walls V4 and V5 of the column totalizer V. In the part V23 (Figures 3a, 3b and 3c) of the cover plate V12 which is of curved form and faces towards the front, a window V24 is arranged through which the result of the calculation may be read.

The side walls V4 and V5 (Figures 3b and 3c) of the totalizer V are provided with hook-shaped projections 41a (Figure 3a) which are adapted to engage on the underside of the dove-tail formed guide rail 9 fixed to the paper carriage 8. In the upper part of the totalizer on the right-hand side the two-armed lever V49 (Figures 3a and 3d) is arranged in such a manner that it is capable of pivoting on the axle V50, which is supported by the side walls, V4 and V5. The hook-shaped part of the lever V49 which extends towards the rear, is adapted to engage with its hook V51 over the guide rail 9. On this engagement taking place the nose V52 of the lever V49, engages with the space lying opposite to it between two of the teeth of a rack V53 on the guide rail 9 and the totalizer V is thereby prevented from being moved laterally. The part V54, which is also arranged on the axle V50, so that it can pivot thereon (Figure 3d), is firmly secured to the lever V49, either by riveting or soldering the arm V55, of the part V54, to the part V56 of this lever V49. The part V54 is formed at its free end with a hook V57 which engages with the guide rail 9. A spring V58 (Figure 3a) has one of its ends connected to the bolt V60, secured in the notch V59 (Figure 3d) in the part V54 and at its other end is connected to the bolt V61, which is secured to the right-hand wall V5 of the totalizer V and this spring acts upon the lever V49 and the part V54 in the anti-clockwise direction, whereby the totalizer V is firmly clamped to the guide rail 9.

On the lever V49 (Figures 3a to 3d) an upwardly directed lug V62 is formed and this lug projects from the totalizer V and is bent over at its free end at a right angle, the bent-over portion being shaped to form a grip V63.

The lever V49 has its forwardly directed end also bent over at a right angle to form a lug V64 (Figure 3d). The lug V64 is provided on its lower edge with a bevelled surface V66, which is adapted to rest against the face V67 of the bent lug V69, which is formed on the slide V68. The slide V68 is slidably mounted in a notch V70 (Figure 3d) on the part V20 and in a notch V71, in the spacing piece V17 by means of the pin-slot connections V16, V72 and V19, V73. To the pin V74 (Figures 3a and 3d) which is secured to the lug V69 of the slide V68, one end of the spring V76 is connected, the other end of this spring being attached to the bolt, V77, secured to the side wall V5 of the totalizer V.

The spring V76 (Figures 3a and 3d) holds the slide V68 in its normal position, which is as illustrated in Figure 3d. The front end of the slide V68 is bent upwards at a right angle and shaped as a grip V78 which projects through the cover plate V12. Tilting of the totalizer V is prevented by the fact that the lug V64 of the lever V49 rests against the lug V69 of the slide V68 and the lever V49 is thus prevented from being unintentionally swung in a clockwise direction in any circumstances whatsoever.

The gear wheel y (Figure 3a) is rotatably mounted on the axle V88 which rests in bearings in the side walls V4 and V5 of the totalizer V. The gear wheel Y is in mesh with the gear wheel X which is rotatably mounted on the axle V90. The axle V90 and the axle V92 are rigidly attached to the side walls V4 and V5 of the totalizer V. The gear wheel X in its turn is in mesh with the gear wheel Z which is rotatably mounted on the axle V92.

The gear wheel Z is firmly secured to the number wheel ZR, which is rotatably mounted on the axle V92. The gear wheel Y as well as the gear wheel X may be brought into mesh alternatively with the reversing gear which is arranged below them in the machine frame.

On the bolt V83 (Figure 3a) a retaining device V95 (Figures 3a and 3e) composed of two parts is mounted so that it can pivot thereon. One of the parts is bent to form the arm V96 by bending at right angles to the angular part V97 at the free end of which the arm V98 is secured. The retaining device V95 is rotatably mounted on the bolt V83 at the point V99 of the arm V96 and at the point V100 of the arm V98. By means of a torsion spring V101 (Figure 3a) the forwardly directed part V102 of the retaining device V95, which is extended laterally on both sides and which is shaped like a tooth, is held in engagement with one of the spaces between the teeth of the gear wheel Y so that the gear wheels Y, X and Z, are secured from unintentional rotation in the non-calculating position, and are only released when the totalizer V is moved into the calculating position. For this purpose, the projection V103 (Figures 3a and 3e) of the arm V98 of the retaining device V95 is acted upon by the lever 366b (Figure 11), which disengages the device from the gear wheel Y.

*Operation of the column totalizer when the value is transferred to the number rollers in an additive sense*

As soon as the wheels 361 of the change-over gear 63 have moved into engagement with the intermediate wheels 356 and the toothed wheels 362 of the change over gear 63 have moved into engagement with the toothed wheels X located in the column totalizer V, as described under the heading "Operation of the change over gear when control mechanism is set on addition", the gradually rising face 277a (Figure 11) of the cams 277 act on the rollers 275 of the levers 272 whereby the same are swung in the anti-clockwise direction. With this, the bridge 271 connecting the two levers 272 takes the driving sectors 268 after one another according to the set value, in addition to which, the toothed segments 292 swingably mounted on them at the point 289 are swung likewise in the anti-clockwise direction, since they are held by means of the springs 295 against the projections D59, of the driving sectors. In this swinging movement of the driving sectors 268 swung out to correspond to the set value, the toothed wheels 361, 357a and 362, are rotated in the direction of the arrows indicated in Figure 12, whereby the value by means of the wheels X are transferred in a positive sense to the number rollers ZR of the totalizer V positioned over the sectors.

*Operation of the column totalizer when the value is transferred to the number rollers in a subtractive sense*

The fork lever 59 swings the change over gear 63 in the clockwise direction from the position illustrated in Figure 3, into the position shown in Figure 13, whereby the toothed wheels 362 of the change-over gear, move into engagement with the intermediate wheels 356 and the toothed wheels 361 of the change-over gear 63 move into engagement with the toothed wheels Y of the column totalizer V.

On the rotation of the main drive shaft 106 (Figure 11) the gradually rising faces 277a of the cams 277 act on the rollers 275 of the levers 272, whereby the same are swung in the anti-clockwise direction. Hereby, the bridge 271 connecting the two levers 272 takes the individual driving sectors 268 along with it, whereby the toothed segments 292 are likewise swung in the anti-clockwise direction by means of the springs 295. The toothed segments 292 now rotate the intermediate wheels 356 corresponding to the set value whereby the toothed wheels 362 (Figure 13) 357a,

361, Y and X are rotated correspondingly to the arrow directions indicated in Figure 13, whereby the value is registered in the column totalizer V and in the negative sense.

*Control mechanism arranged on column totalizer for controlling the working conditions of the two cross totalizers*

On the column totalizers V there are arranged control levers 108 (Figure 9) 109, 110 and 111, which act to set the working conditions of the two cross totalizers Q and Q₁ (Figures 1 and 11) the two control levers 110 and 111 serving for the changing over of the cross totalizer Q and the two control levers 108 and 109 for the changing over of the cross totalizer Q₁. By means of the control levers 109 and 111 the corresponding cross totalizer may be changed over on to "addition" (add), "sub-traction" (sub.) or "disconnected" (disc.) and by means of the control levers 108 and 110 on to "total" (tot.), "sub-total" (sub. tot.) or "normal" (norm.).

In the front portion of the column totalizer V there is provided as shown in Figure 3a, an intermediate wall, V25, which is secured to the side walls V4 and V5 by means of the screws V26. The bolt V27 which extends into the intermediate wall V25 is reduced at its end V28 and provided with a screw thread, while at its other end V29 the screw head is formed. The end V28 of the bolt V27 is screwed into a hole V30, which is formed in the intermediate wall V25 and has a corresponding screw thread to that formed on the end V28 of the bolt V27. On the bolt V27 the control levers V31 are mounted so as to be capable of oscillation thereon, the control levers serving to set other totalizers for operation. The control levers 108 to 111 (Figure 3c) have notches V32 with which engage the noses V33 of the pawls V35 one of which is provided for each control lever. The pawls V35 are arranged so that they can pivot around the axle V34 and the control levers 108 to 111 are capable of being held by the pawls V35 in each of three different positions (Figure 3c). The pawls V35 are acted upon by the torsion spring V36, so that they always engage with one of the notches V32. The control levers 108 to 111 are adapted to be adjusted by hand, by means of the grip-shaped parts, V37 (Figures 3a and 3c) the faces V31a, of the control levers 108 to 111 acting upon the noses of the two-armed levers 113 to 116 (Figures 9a and 9b) which are arranged so that they can pivot around the axle 100a.

Figure 3c shows the different positions of the control levers. The dotted line position in this figure shows the position of the control levers 109 and 111 for addition, "add." the continuous line position for "disconnected" (disc.) and the dot and dash line position for subtraction "sub.".

In order to protect the control levers 108 to 111 against unintentional displacement and to maintain them in the position into which they have been set, the following arrangement has been provided. An axle V38 (Figure 3c) which is rotatably mounted at one end in the intermediate wall V25 (Figure 3a) and at the other end, in the front wall V3 is flattened on the surface which normally faces the pawls V35 so that each of these pawls V35 may be freely disengaged by swinging in an anti-clockwise direction, if the corresponding control lever, 108 to 111 is swung out of position. On the axle V38, a knob V40 (Figures 3a and 3b) is rigidly secured by the screw V39 by means of which knob the axle V38 may be rotated through an angle of slightly greater than 90 degrees. On the neck V41 of the knob V40 is arranged a device, V40a (Figure 3b) which indicates the normal and operative positions of the axle V38 and is capable of being retained in either of these positions. The indicating device V40a is formed of spring steel and has at its end V42 (Figures 3a and 3b) a projection V43, which is adapted to snap into corresponding depressions V44 (in Figure 3b, only one is visible as the indicating device is in its normal position) and thus holds the axle V38 in the position in which it has been set.

If it is desired to prevent the control levers 108 to 111 (Figures 3a, 3b, and 3c) from being unintentionally swung out of one of the three positions, the axle V38 is rotated by means of the knob V40 through an angle slightly greater than 90 degrees, in a clockwise direction until the projection V43, of the indicating device V40a, snaps into the depression V44, on the front wall V3. The above movement causes the surface V45 of the axle V38 to contact with the face V46 of the pawls V35 and thus prevents the nose V33, of the pawls from being disengaged from one of the notches V32 of the control levers 108 to 111 and the latter are thereby prevented from being displaced from the position into which they have been set.

*Control mechanism for controlling the working condition of the cross totalizer Q on normal, total and sub-total*

The control lever 110 (Figure 9a) arranged in the column totalizer V acts for changing over the cross totalizer Q from "normal" (norm.) to "total" (tot.) and "sub-total" (sub. tot.). This control lever 110 acts on the nose 115 of a two-armed feeler lever 115, which is arranged on the shaft 100a (Figure 9a) swingable in the adding machine 3. To the other limb of the feeler lever 115 (Figures 9 and 9a) is jointed a connecting rod, 181. The free downwardly-projecting end of the connecting rod 181 is in pivotal connection with the horizontal limb of an angle lever 182 swingably mounted on the shaft 121.

The downwardly-directed limb of the angle lever 182 (Figures 9 and 9a) is in pivotal connection with its slide 184 which is displaceably mounted in slots 18 of the intermediate wall 18 of the adding machine 3. The "normal" position of the mechanism just described is determined through a spring 182a (Figures 9 and 9a) which engages with the angle lever 182 whereby a U-shaped laterally swingable member 186 is positioned against a member 189.

Into a slot 184a of the slide 184 (Figure 9a) there projects an arm 185 of the member 186. A spring 191 at one of its ends is attached to a pin 190 and at its other end, engages with the shaft 187. The spring 191 acts on the members 189 and 186 in the anti-clockwise direction, round the shaft 69, whereby the arm 192 (Figures 7 and 9) of the member 186 rests on one of the levers 193, 194 and 195, whereby its normal position is determined.

The levers 193, 194 and 195 (Figures 7 and 9) are swingable on the same shaft (not illustrated) as the levers 97, 98, 99 or 135, 136 and 137 and are acted upon in the clockwise direction by torsion springs (not illustrated) in the clockwise direction, whereby their corresponding rollers, 196, 197 and 198, contact with the cams 199, 200 and 201 which in addition to intermediate discs, are non-rotatably mounted on the main drive shaft 106 of the machine, whereby the cam 199 is designed for the normal position (norm.), the cam 200 for the total-taking (tot.), and finally the cam 201, for sub-total (sub. tot.) taking.

*Operation of the control mechanism for controlling the working condition of the cross totalizer Q standing on normal*

Now let it be assumed that the setting lever 110 (Figure 9a) for setting on total, sub-total and normal, and mounted on the column totalizer V is set at "norm.". In this case, the levers 186, 192 (Figures 9a and 7) co-act with the lever 193 which for its part co-acts with the cam 199.

If the motor key 11 (Figure 1) is now depressed, and the main drive shaft 106 (Figure 11) is thereby driven in the anti-clockwise direction, after one-half of a revolution of the shaft 106 the lever 193 (Figure 7) is swung in the anticlockwise direction against the action of a torsion spring (not illustrated) in consequence of a roller 196 running up on to the raised portion of the cam 199. In consequence of this, the member 192, 186 (Figures 7 and 9a) is swung in the clockwise direction and together with it also the arm 229 arranged on the member 189.

Since the pin 228 (Figures 9a and 10) now projects on the one hand into the recess 224 of the fork lever, 215, and on the other hand, into the recess 236 of the member 226 which is held by the action of the spring 235 swung in the clockwise direction round the point 225 as is clear from Figure 10 the arm 229 of the lever 189 is positively connected to the fork lever 215. In consequence of this, the fork lever 215 moves in the direction of the arrow "L", whereby it moves inoperatively past the pins 222 and 223 of the cross totalizer Q.

As it would be too exhaustive to treat in detail the separate shift possibilities of the totalizer Q it may be only mentioned here that from Figures 9a, 7 and 10, the possible separate settings can be readily perceived.

If the lever 115 is swung in the clockwise direction up to the line indicated by "tot.", the lever 186, 192 is set by way of the lever 194 (Figure 9a) whereby total-taking results. If the lever 115 (Figure 9a) is still further swung up to the line indicated by "sub. tot.", the lever 186, 192 is set by way of the lever 195 (Figure 7), whereby sub-total taking results.

*Controlling mechanism for controlling the working condition of the cross footer Q on addition, disconnected and subtraction.*

The control lever 111 (Figure 9a) arranged in the column totalizer V serves to set the cross totalizer Q from "addition" (add.) to "disconnected" (disc.) and "subtraction" (subtr.). For this purpose the control lever 111 is capable of acting on the knee 119 of the lever 116. In the position according to Figure 9a, a column totalizer V is located directly over the lever 116 set by the lever 111 on "disconnected", whereby the lever 116 is swung against the action of its spring 202a in the clockwise direction.

The other end of the lever 116 (Figures 9 and 9a) is pivotally connected with a connecting rod 202 which in turn at its free downwardly-directed end is jointed to a T-shaped lever 205. By means of a screw 205b the lever 205 is swingably mounted on a supporting member 205a arranged on the intermediate wall 19. Pins 206 and 207 arranged on the lever 205 co-act with a control member 208.

To one of the ends of the control member 208 (Figures 9 and 9a) is jointed a connecting rod, 209, which at its other end, is jointed to the pin 46 of the lever 29, 29a, 29b of the general change-over key 14.

At the other end of the control member 208 (Figures 9 and 9a) there is jointed by means of a screw 213a a downwardly-directed arm 238 of an angle lever 211 which is swingably mounted on the threaded pin 51. A downwardly inclined arm 213 of the angle lever 211 is in turn in pivotal connection with a connecting rod 214 which at its other end is jointed to a fork lever 215 by means of a screw 216.

The fork lever 215 (Figures 9a, 10 and 10a), consists of two parts 215a and 215b and is guided in a supporting member 217 which is attached to the intermediate wall 19 of the adding machine 3 by means of screws 218. The two parts 215a and 215b of the fork lever 215 are rigidly connected with one another by means of screws 216 and 219. The part 215b of the fork lever 215 is provided with two recesses, 220 and 221, into which pins 222 and 223 respectively are capable of entering. The pins 222 and 223 are arranged on the cross totalizer Q. The pins 222 and 223 project to the left through openings in the intermediate wall 19 of the adding machine 3 (Figure 14).

The other end of the fork lever 215 (Figures 9a, 10 and 10a) is provided with a slot 224. At 225 there is jointed a member 226 which is provided with a slot 227 into which a pin 228 is capable of entering the pin 228 being fixed to an arm 229 formed on the part 189. The pin 228 also projects into the slot 224 of the fork lever 215. The member 226 has further two slide faces 203 and 231 as well as a nose 232, which is capable of coacting with a pin 265. The spring 235 (Figures 10 and 10a) which on the one hand, engages with the lug 233 of the part 215a of the fork lever 215 and on the other hand, is connected to the lug 234 of the member 226 acts on the member 226 in the clockwise direction round the pivot 225, whereby the pin 228 of the arm 229 moves into the stop 236 of the slot 227 of the member 226. By the pull of the spring 191 which engages with the part 189 the parts are held in their rest positions illustrated in Figure 10, while the fork lever 215 is held in its uncoupling position illustrated in Figure 9a by way of the parts 214, 213, 211, 210, 208, 207, 205, 202 and 116, through the lever 111 of the totalizer V and the spring 202a engaging with the lever 116.

*Operation of the control mechanism for controlling the working conditions of the cross totalizer Q standing on disconnected*

If the control lever 111 (Figure 9a) of the column totalizer V is located at "disc.", this lever acts when the column totalizer V moves into the working position on the control lever 116 and swings the same round the shaft 180a in the clockwise direction into the position illustrated in Figure 9a. Hereby the connecting rod 202 jointed to the lever 116 is displaced in the direction of the arrow "P", and the angle lever 205 jointed to the connecting rod 202 is swung round the threaded pin 205b in the anticlockwise direction. Since the pin 207 of the lever 205 is in engagement with the recess 207g of the control member 208, the latter is displaced to the right, whereby the member 238 is swung round the threaded pin 51 in the anti-clockwise direction. The connecting rod 214 jointed to the arm 213 of the member 238 consequently swings the fork lever 215, round the pin, 228, of the lever, 229 in the clockwise direction, whereby the recess, 220 of the fork lever, 215 moves out of engagement with the pin 222, of the cross totalizer Q. This position of the parts is illustrated in Figure 9a. When no column totalizer V is located in the operative position, the recess 220 of the fork lever 215 embraces the pin 222 of the cross totalizer Q since the spring 202a engaging the control lever 116 usually holds the control lever 116, swung in the anti-clockwise direction, which is determined by contact of the lever 116 with the member 100. If therefore, no column totalizer V is in the operative position, the control lever 215 stands normally in the addition position.

If, e. g., no column totalizer is located over the lever 116, then the cross totalizer, Q, operates additively. If, however, the lever 111 (Figure 9a) of the column totalizer V projects still further out of the same as is illustrated in Figure 9a, when the column totalizer V moves into the operative position, the lever 116 will be swung still further in the clockwise direction. The fork lever 215 will then engage with the pin 223 of the cross totalizer Q which consequently operates subtractively.

*Control mechanism for controlling the working condition of the cross totalizer $Q_1$ on normal, total and sub-total*

The nose 108a (Figures 9 and 9b) of the control lever 108, located on the column totalizer V acts on a knee 112 of a two armed lever 113 which together with the two-armed levers 114, 115 (Figure 9a) and 116 are swingably mounted on the shaft 100a. The shaft 100a is mounted in a bridge, 100, which is attached on the one hand to the intermediate wall 19 by means of screws 100b and on the other hand to the typewriter wall, by means of screws (not illustrated).

To the other limb of the lever 113 (Figures 9 and 9b) a connecting rod 128 is jointed which at its free downwardly projecting end, is jointed to the horizontal limb of an angle lever 122 swingable round the shaft 121.

The downwardly directed limb of the angle lever 122 (Figure 9b) is in pivotal connection with a slide 126 displaceably arranged in slots in the intermediate wall 19 of the adding machine 3. Into a slot 126a of the slide 126 there projects an arm 127 of a member 128 (Figures 9 and 9b) which is constructed correspondingly to the part 71 (Figure 6a). The member 128 embraces consequently the member 131 with its limbs 129 and the member 131 corresponds to the member 68 (Figure 6a). The member 131 however has a pin 132 in place of the arm 67 (Figure 6a) of the member 68 and to this pin a spring 133 is attached which is connected to the shaft 107. By means of the spring 133 (Figure 9) the members 131, 128 are swung in the anti-clockwise direction round the shaft 69 whereby the arm 134 (Figures 7 and 9) of the member 128 contacts with one of the levers 135, 136 or 137. The levers 135, 136 and 137 are of similar shape to the levers 87, 88, and 89 and are swingable round the same shaft (not illustrated). They are likewise acted upon in the clockwise direction by torsion springs (not illustrated) whereby their corresponding rollers 138, 139 and 140 contact with the cams 141, 142 and 143, which with intermediate lying discs are non-rotatably mounted on the main drive shaft 106 of the machine. Of these cams, the cam 141 is designed for the normal position (norm.) the cam 142 for taking the total (tot.) and the cam 143 for taking the sub-total (sub. tot.).

By means of the spring 122 (Figure 9b) which engages with the angle lever 122, the parts 122, 128 and 113 are held in the position (norm.) illustrated in Figure 9b, which is determined by the contact of the member 128 (Figure 9) with the member 131.

*Control mechanism for controlling the working condition of the cross footer $Q_1$ on disconnected, addition and subtraction*

In the position according to Figure 9b, a column totalizer V is located directly over the knee 117 of the lever 114 which has been set on "disconnected" by the lever 109 whereby this appears swung in the clockwise direction against the action of the spring 144a.

To the other end of the lever 114 (Figures 9 and 9b) there is jointed a connecting rod 144, which again at its other downwardly-directed end is jointed to a limb 146 of the T shaped lever 147. This is swingably mounted by means of a screw 147a on the supporting part 20 (Figures 9b and 6). The pins 148 and 149 (Figures 9 and 9b) arranged on the lever 147 are capable of coacting with a control member 150. This is jointed by means of a connecting rod 151 to the pin 46 of the lever 28, 29a, 29b of the general changeover key 14. The other end of the control member 150 is jointed by means of a screw 155a to a downwardly directed limb 153 of an angle lever 154 arranged on the threaded pin 51. A horizontal limb 155 of the angle lever 154 is in connection with a connecting rod, 157, being jointed thereto by means of a screw 158.

The connecting rod 157 is jointed by means of a screw 158 to a fork lever 159 (Figure 10).

The fork lever 159 (Figures 9, 9b and 9c) consists of two parts 159a and 159b, which are rigidly connected to each other by means of screws 160 and 160a for the purpose of adjusting the total length of the fork lever 159. The part 159b of the fork lever 159 has recesses 161, and 162, which are capable of co-acting with pins 163 and 164 (Figures 9, 9b and 18) arranged on the cross totalizer $Q_1$ and these pins project to the left (Figure 9b) through openings in the intermediate wall 19. The fork lever 159 (Figures 9, 9b, 10 and 10a) is guided in a supporting member 166 fixed to the intermediate wall 19 of the adding machine 3 by means of screws 165 and is held in its uncoupling position illustrated in Figure 9b, by way of the parts 157, 155, 154, 153, 150, 149, 147, 144 through the lever 109 of the totalizer V and the spring 144a engaging with the lever 114.

The end of the fork lever part 159a (Figures 9, 10, and 10a) which projects to the left is provided with a slot 167. A member 169 is jointed at 168 and this member is provided with a slot 170, a nose 171 and two slide faces 172 and 173. A spring 175 engages with a lug 174 of the fork lever part 159a, the other end of this spring being connected to a lug, 176, of the member 169. This spring acts upon the member 169 in the clockwise direction round its pivot 168 whereby the pin 177, which is fixed to the arm 178 of the member 131 moves into the stop 179 (Figure 10a) of the slot 170 of the member 169, whereby the normal position of the parts 159, 169, 178, according to Figure 10 is determined in consequence of the pull of the spring 133 on the member 131, whereby the parts 159, 169, 178 are in pivotal connection.

As it would be too exhaustive to treat in detail the separate shift possibilities of the totalizers Q and Q₁, it may be only mentioned here, that from Figures 9a, 7 and 10, the possible separate settings can be readily perceived.

*Locking mechanism for the control mechanism for controlling the working conditions of the two cross totalizers Q and Q₁*

The parts to be described in the following, which hold during the drive, the control members 208 (Figure 9a) and 150 (Figure 9b) in their positions obtaining for the time being, are similarly constructed for both cross totalizers Q and Q₁, for which reason, they will only be described for the cross totalizer Q₁. The reference symbols for the parts, associated with the cross totalizer Q are for the purpose of differentiation placed in brackets in the description.

The downwardly-projecting limb 237 (238) (Figures 9, 9a and 9b) of the U-shaped angle lever 154 (211) is provided with recesses, 239 to 241 (242 to 244) into which a lug 245 of an angle lever 249 swingably mounted on a screw 247 (Figure 9) on the intermediate wall 19 is capable of entering, whereby the control members 150 (208) and the parts connected with them or with the angle lever 154 (211) are held in their set position for the time being, against the action of the springs 144a (202a) (Figures 9a and 9b). The downwardly projecting short arm 249a (Figures 9 and 9a) of the angle lever 249, embraces, by means of its fork-shaped end, a pin 250c (Figure 9), which is riveted to the upwardly-projecting short arm, 250a of the angle lever 205 swingably mounted on the screw 250b on the intermediate wall 19. The other free end of the angle lever 205 (Figures 8 and 9) feels by means of its part 251, a disc 253 rigidly mounted on the shaft 106 and formed as a cam. By means of a spring 256 connected on the one hand to a pin 255 fixed in the intermediate wall 19 and on the other hand, to the angle lever 249 both of the angle levers 249, 250 are held in their rest position which is evident from Figure 9, in which the part 245 of the angle lever 249 leaves the parts 237 (238) unaffected.

*Operation of the locking mechanism for the control mechanism for controlling the working condition of the cross totalizer Q*

In order, therefore, to secure the fork lever 215 (Figure 9) in its position for the time being, the angle lever 205 is swung in the clockwise direction on the rotation of the shaft 106 (Figures 8 and 9) by the disc 253, mounted on the same and the angle lever 250 for its part swings the angle lever 249 in the anti-clockwise direction. The part 245 (Figures 9 and 9a) of the angle lever 249, thereby engages one of the stops 242 to 244 (Figure 9) whereby the lever 238 is held in its position for the time being and consequently the fork lever 215 by way of the parts 211 (Figure 9a) and 214.

*Operation of the locking mechanism for the control mechanism for controlling the working condition of the cross totalizer Q₁*

In order, therefore, to secure the fork lever 159 in its position for the time being the angle lever 250 is swung in the clockwise direction on the rotation of the shaft 106 (Figures 8 and 9) by the disc 253, mounted on the same and the angle lever 250 for its part, swings the angle lever 249 in the anti-clockwise direction. The part 245 (Figures 9 and 9a) of the angle lever 249 thereby engages one of the stops 239 to 241 (Figure 9b) whereby the lever 153 is held in its position for the time being and consequently the fork lever 159 by way of the parts 153, 154, 155, 157.

*Locking mechanism to lock the tens shift lever of the cross totalizer Q₁ on taking totals and sub-totals*

To the other limb of the lever 113 (Figures 9 and 9b) a connecting rod 120 is jointed which at its free downwardly projecting end is jointed to the horizontal limb of an angle lever 122 swingable round the shaft 121. The end 122b (Figure 9b) of the horizontal limb, of the angle lever 122 projects into a slot 122c, of a slide 122e, guided at 122d, on the intermediate wall 19 and this slide at its other end is jointed to a lever 122g, which is swingably mounted at 122f. The lever 122g is connected by a comb 122h with a lever 122i, which is swingably mounted on the wall Sr of the adding machine by means of a screw 122j. The yoke 122g—122h, 122i, so formed, serves on the one hand for guiding the tens shift lever 303 arranged on a shaft 306 Figures 9b and 11) and on the other hand, on being swung in the clockwise direction, is capable of lying over the projection 303x of the tens shift lever 303 in order to lock this on taking totals and sub-totals.

As the operation of the locking mechanism may be clearly understood from the drawings a description of the operation will not, therefore, be given.

*Locking mechanism to lock the tens shift lever of the cross totalizer Q on taking totals and sub-totals*

The end 182b (Figure 9a) of the horizontal limb of the angle lever 182 projects into a slot 182c, of a lever 182e, which is rotatably mounted on a screw, 182d, on the intermediate wall 19. A pin 182f fixed to the lever 182e, co-acts with a slot 182g of an angle lever 182h, which, by means of a screw 182i, is swingably mounted on the intermediate wall 19 of the adding machine 3. The angle lever 182h is connected through a comb 182j with a lever 182m swingably mounted on the adding machine wall Sr by means of a screw 182k. The yoke formed by the parts 182h—182j—182m acts on the one hand to guide the tens transfer lever 302 swingably mounted on the shaft 305 (Figures 9a and 11) and on the other hand on being swung in the clockwise direction, is adapted to rest on the projection 302x, of the tens transfer lever 302 in order to lock the same in its rest position on taking totals or sub-totals.

The operation of the locking mechanism may be clearly understood from the drawings and therefore a description of said operation will not be given.

*Cutting out mechanism for both of the cross totalizers*

On the intermediate wall 19 (Figures 9, 10 and 10a) of the adding machine 3, a push rod 259 is displaceably mounted by means of a screw 258. This push rod 259 is provided with an angular slot 260 and carries on its free end, which projects through the front wall of the adding machine 3, the knob 15 (Figures 1, 2 and 9). The push rod 259 is arranged at such a distance from the intermediate wall 19 that it does not impede the fork lever 215 in its swinging movements.

The rearwardly directed end of the push rod 259 (Figures 9, 10 and 10a) is pivotally connected to a lever 262 swingably mounted on the shaft, 69. The lever 262 is rigidly connected by means of a bridge 263 with the lever 264 which is likewise swingable on the shaft 69. To the downwardly directed limb of the lever 264 there is fixed a pin 266 which is capable of co-acting with the slide faces 172 and 173 of the member 169. Similarly a pin 265 is fixed to the lever 262 and this pin for its part is capable of acting on the slide faces 230 and 231 of the member 226.

Operation of cutting out mechanism for both of the cross totalizers

An arrangement for completely cutting out both of the cross totalizers Q and $Q_1$ will now be shortly described.

If, for any reason, the two cross totalizers Q and $Q_1$ are to be cut out from a calculating operation, then it is only necessary to press on the knob 15 (Figure 1) whereby the slide 259 (Figure 10) is displaced so far in the direction of the arrow "R" that it has taken up the position illustrated in Figure 10a. With this, the U-shaped yoke 262—263—264 is swung in the anti-clockwise direction round the shaft 69, in which movement, the arms, 264 and 262, also participate, whereby the pin, 266, and the pin, 265, first act on the faces, 172 and 230, and on the members, 169, 226 in the anti-clockwise direction against the action of the springs 175, 235. Then the pins 266 and 265 slide on the faces 173 and 231 of the members 169 and 226 and swing the latter completely into the position illustrated in Figure 10a, whereby the pin 177 has moved out of the recess 179 of the member 169 and the pin 228 out of the recess 236 of the member 226. Consequently, on the operation of the machine in which the levers 128, 186 (Figure 10a) and the arms 178, 229 are swung in the clockwise direction, the pins 177 and 228 of the arms 178 and 229 move idly to and fro in the openings 170 and 227 of the parts 169 and 226 without acting on the fork levers 159 and 215. After release of the key 15, the parts are swung out of their position illustrated in Figure 10a again into the position illustrated in Figure 10, with which the parts have again taken up their rest position or normal position.

Locking mechanism for the column totalizer and the two cross totalizers

On the shaft 106 (Figure 22) further, two cams 472 and 472a are rigidly mounted one of the cams being located at the right hand side of the shaft and the other at the left hand side thereof, and these cams undertake the locking and unlocking of the totalizers, if from the same a total or a sub-total is to be taken. The right hand as well as the left-hand cam of the cams 472, 472a are each felt by a roller 463 (463a) arranged between the two levers 462 (462a) and the rollers are held in contact with the cams by means of springs 468 (468a) which on the one hand are connected to the member 460 (461) and, on the other hand, to a pin 468b (468c). With each pair of levers, 462 (462a) a locking lever 460 (461) is swingably mounted on the shaft 267. The locking lever 460 lying to the left when viewed in the direction of the arrow B in Figure 22, has three arms 464, 465 and 466, extending in the direction of the totalizers and these arms are provided with locking noses and at their upper ends, are guided in slots (not illustrated) in the guide plate 282. The lever 461 on the contrary has only two arms 465a and 466a extending in the direction of the upper and lower cross totalizers Q and $Q_1$ and these arms are likewise provided with noses and are guided in the guide plate 282. The arms 462, 464, 465 and 466 are connected with one another by means of a stiffening stay 467. In the change-over gear for the column totalizers V as well as in the upper and lower cross totalizers the following locking arrangement is provided. On the shaft 360 of the change-over gear 63 for the column totalizers V a locking member 469 is swingably mounted. If the locking member 469 is located in its position represented by dotted lines in Figure 22, i. e. the rest position corresponding to the middle position of the change-over gear 63, this locking member is positioned against the edge $x$ of the slot in the guide plate 282 and of course under the action of the spring 469a connected to the side wall 358 of the change-over gear 63 and to the locking member 469. In the upper cross totalizer Q two locking members 470 and 470b are swingably mounted on the shaft 400 and in the lower cross totalizer $Q_1$ two locking members 471 and 471b are similarly mounted on the shaft 433. The locking members 470, 471 (470b, 471b) are always acted upon in the anti-clockwise direction, by means of torsion springs 470a (470c) and 471a (471c), whereby their rest positions are determined by the limits of the slot edges X1, X2 of the guide plate 282.

Operation of the locking mechanism for the column totalizer

On the swinging in of the change over gear 63 (Figure 22) the locking member 469, slides out of the rest position illustrated by dotted lines in Figure 22, over the nose 464a, of the arm 464 and snaps under the action of its spring underneath the locking nose 464 since the rollers 463, 463a run up on to the raised portion of the cams 472 and hold the arm 464 in the operative position. On further rotation of the shaft 106 total taking is effected whereby by the swinging of the tooth segments 292 (Figure 11) the tens shift noses $yn$ of the wheels Y by way of the known wheel train, are held by the noses 95g of the levers 95 which are prevented from swinging by a member 93a (Figure 6). During total-taking, the rollers 463, 463a as is evident from Figure 22, run on the raised part of the cams 472, 472a. Hereby the totalizer V concerned set for total or sub-total is secured against swinging which can occur through the contact of the tens shift noses $yn$ on the noses 95g of the tens transfer lever 95.

After the printing of the value or if the same is again registered in the number rollers ZR (Figure 22) in the case of a "sub-total", the rollers 463, 463a on the further rotation of the shaft 106, move down from the raised part of the cams 472, 472a on to the lower part of the same, whereby the arm 464 of the locking member 460 slides from the nose of the locking member 469 and releases the same. The change-over gear is now swung back back into its rest position during the last part of the revolution of the shaft 106, whereby the locking member 469 again takes up its rest position shown in dotted lines in Figure 22.

Operation of the locking mechanism for the two cross totalizers

In exactly the same manner as described under the heading of the locking mechanism for the column totalizer the locking members 470, 470b and 471, 471b of the cross totalizers Q and $Q_1$, coact with the locking noses 465, 465a and 466, 466a only with this difference that in this case on each side of each totalizer Q and Q₁, a locking member is provided.

Driving mechanism

On the shaft 267 (Figures 11 and 23) are swingably mounted driving sectors 268 which correspond in numbers to the greatest number of calculating places of the column totalizers V and of the cross totalizers Q and Q₁ of which sectors, the rearwardly directed arms 269 are connected to the printing rods T (Figure 23). Downwardly directed fork-shaped arms 270 embrace pins U1, fixed to the feeler rods, U. The feeler rods U, are capable of co-acting with stops S1 representing the values "0" to "9" arranged in a displaceably mounted stop carriage, in the manner described in British patent specification No. 379,811.

By means of the springs T₁ engaging with the printing rods T which springs, as is illustrated in Figure 23, for the purpose of compactly arranging the driving sectors 268, and the printing rods for the typewriter step, are arranged in layers, the driving sectors, 268, are acted upon in the clockwise direction and thus rest on a bridge 271 (Figure 11) which both on the left and right-hand sides of the driving sector set is fixed to one each of two angle levers 272 by means of screws 273. The two free downwardly directed arms 274 (in Figure 11, the left only is visible) of the levers 272 are each provided with a roller 275 each roller co-acting with a corresponding cam, 277 arranged on the main drive shaft 106. The rollers 275 of the two-armed levers 272 in the normal position are held in contact with the raised parts of the cams 277 by means of springs 280 which on the one hand, are connected to a pin, 278, arranged on the side walls and on the other hand, to the arm 279 of the angle levers 272. The driving sectors 268 are guided by means of their parts 281 which engage in slots (not illustrated) in a guide plate 282 rigidly mounted on the right-hand side wall, SR, and on the intermediate wall 19 of the adding machine 3.

The driving sectors 268 (Figure 11) are provided with lugs D59, 284 and 285, which co-act with the projections 286, 287 and 288 of three toothed segments 292, 293 and 294, swingably mounted on the driving sectors 268 by means of pins 289, 290, 291. The toothed segments 292, 293 and 294 are normally held with their noses 292b, 293b and 294b in contact with the noses 298, 299 and 300, of the lever 301, 302 and 303 by means of springs 295, 296 and 297, which on the one hand engage with the arms 292a, 293a and 294a, of the toothed segments 292, 293 and 294 and on the other hand are connected with parts 268a, 268b and 268c, of the driving sectors.

In order to be able to bring together the driving sectors to the typewriter step distance, the springs, 295, 296 and 297 are staggered as shown in Figure 24. The tooth segments 292, 293 and 294 are swingable round special small pins 289, 290 and 291 to reduce frictional resistance to their movement.

Operation of the driving mechanism

If now the machine is set into operation by depression of the motor key, 11 (Figure 1) whereby the shaft, 106 (Figure 6) is driven in the anti-clockwise direction, all of the cams fixed to the shaft 106, participate in this rotation. As soon as the rollers 275 (Figure 11) of the yoke 272—271—272 move from the raised part of the cam 277 on to the lower part thereof, the yoke 272—271—272 is swung in the clockwise direction under the action of the spring 280. In this swinging movement the driving sectors 268 participate, since the same under the action of the springs T₁ engaging with the printing rods T (Figure 23) are acted on by way of the arm 270 (Figure 11) in the clockwise direction, whereby the feeler rods U connected with the arms 270 (Figure 11) are led against the set stops in the stop carriage, whereby the driving sectors 268 are rotated in the clockwise direction corresponding to the set value.

Shortly before a completion of a revolution of the shaft 106, the gradually rising face 277a (Figure 11) of the cams 277 act on the rollers 275 of the levers 272 whereby the same are swung in the anti-clockwise direction. With this, the bridge 271 connecting the two levers 272 takes the driving sectors 268, after one another according to the set value, in addition to which, the toothed segments 292 swingably mounted on them at the point 289 are swung likewise in the anti-clockwise direction, since they are held by means of the springs 295, against the projections D59 of the driving sectors.

The toothed segments 292 (Figure 11) are stopped by the noses 298 of the pawls 301 one tooth earlier than the driving sectors 268. As soon as the rollers 275 have arrived again on the raised portion of the cam 277, the swinging movement of the driving sectors 268 in the anti-clockwise direction is finished, whereon these have again taken up their normal position.

Tens carrying mechanism for the column totalizer and the two cross totalizers On the axle 95h (Figures 3, 3a) of the totalizers V the tens transfer lever 95 is rotatably mounted and is acted upon in the clockwise direction by a spring 95k which at one end is engaged with the hook V81 of the lever 95 and at the other end is connected to the spacing piece V7 so that the lever 95 normally rests with its projection V82 against the bolt V83 which is secured in the side walls V4 and V5. The lever 95 has a notch 94 with which the locking lever 92 (Figure 6) is adapted to engage which latter swings round the points 93. The nose 95g (Figures 3 and 3a) of the lever 95 is acted on by a tooth yn, which is formed on the cam V86 (Figure 3f). The nose 95g does not normally lie on the cam V86, as the tension of the spring 95k is absorbed by the contact of the projection V82 of the lever 95 with the bolt V83. This arrangement prevents the cams V86 (Figure 3f) and the parts X, Z, ZR, associated with them, being unnecessarily hampered in their movements. The cam V86, is rigidly attached to the gear wheel y (Figure 3a) rotatably mounted on the axle V88 which rests in bearings in the side walls V4 and V5 of the totalizer V.

The levers 301, 302, 303 (Figure 11) are swingably mounted on shafts 304, 305 and 306 which are rigidly mounted in the right-hand side wall, Sr, and in the intermediate wall 19 of the adding machine 3. On each of the limbs 307 and 308 of the levers 302 and 303 are formed two noses, 309, 310 and 311, 312. The noses 309 and 310 are capable of co-acting with tens shift cams 313 and 314 (Figures 11 and 15 to 17) of the toothed wheels 315 and 316, of the cross totalizer Q and the noses 311 and 312 with tens shift cams 317 and 318 (Figures 11 and 19 to 21) of the toothed wheels 319 and 320 of the cross totalizer Q₁. The limbs 321 of the levers 301, the limbs 322 of the levers 302 and the limbs 323 of the levers 303 co-act with the pawls 327, 328 and 329, which are swingably mounted on the shaft 324, 325 and 326, rigidly mounted in the intermediate wall of the adding machine 3. By means of the springs 336, 337 and 338, which on the one hand, are connected to the noses 330, 331 and 332 of the pawls 327, 328 and 329 on the other hand engage with the limb 333 of the lever 301 and with the noses 334 and 335 of the levers 302 and 303, the pawls 327, 328 and 329 together with the levers 301, 302 and 303 are held in the normal position illustrated in Figure 11. The upwardly-directed limb 333 of the levers 301 acts with the tens transfer lever 95 arranged in the column totalizer V. The limbs 321, 322 and 323 of the levers 301, 302 and 303 are as against their limbs 333, 307 and 308 bent off to the left (in the direction of the arrow "B" seen in Figure 11) for the distance of the width of one decimal place, so that a tens transfer from a lower decimal place to the next higher decimal place is possible.

Within the compartment formed by the intermediate wall 19 and the right-hand side wall Sr of the adding machine 3, cams 340 (Figure 11) are rigidly mounted one at the right hand and one at the left hand on the shaft 106. The right hand as well as the left hand cam 340 are each felt by a roller 342 each of which is held between two levers 341a'. These are each fixed to a lever 341 which are rotatably mounted on the shaft 267 to the left and right of the set of sectors 268 and which have each three arms 341a, 341b and 341c. The bent off ends of these arms are connected amongst themselves by bridges 343, 344 and 345 by means of the screws 346, whereby a three armed yoke is formed which is controlled by the cams 340. The limbs 347, 348 and 349 of the bridges 343, 344 and 345 are capable of co-acting with the noses 350, 351 and 352 of the pawls 327, 328 and 329. In their rest position the bridges 343, 344 and 345 as is evident from Figure 11, lie between the noses 350, 351 and 352 of the pawls 327, 328 and 329 and the noses 292b, 293b and 294b, of the toothed segments 292, 293 and 294. By means of a spring 354 which engages with an arm 341c of the three-armed yoke 341 and is also connected to a pin 353 fixed in the right-hand side wall Sr of the adding machine 3, the three-armed yoke 341 by means of its rollers 342 is held in contact with the cams 340.

In this position the bridges 343, 344 and 345 of the three armed yoke 341 are positioned just between the noses 350, 351, 352 and 298, 299, 300 of the levers 327, 328, 329 and 301, 302, 303.

On the tens shift levers 302 (Figure 11) which co-act with the cross totalizer Q there are provided two tens shift noses 309 and 310. This is necessary in order to be able to co-act with the tens shift teeth 313 of the wheel set 315 in addition and in subtraction to co-act with the tens shift teeth 314 of the wheel sets 316 of the cross totalizer Q.

What has been said above in regard to the tens shift levers 302 (Figure 11) of the cross totaliser Q applies also to the tens shift levers 303 of the cross totalizer Q₁.

*Operation of the tens carrying mechanism for the column totalizer*

In the following, the operations will be described which are performed when a tens transfer occurs. If, for example, the value "8" is registered on the number roller, ZR, farthest to the right of the column totalizer V and if the value "5" is to be added to it, a tens transfer must take place in order to obtain the correct result.

If the number rollers ZR (Figure 3) are rotated in the additive direction, i. e. in the arrow direction indicated in Figure 3, the toothed wheels, Y, are also rotated in the same direction. At the moment in which the number roller, ZR, of the unit's place rotates from "9" to "0", the cam, yn, formed laterally on the toothed wheel, Y, acts on the nose, 95g, of the lever, 95, and swings the same round its pivot, 95h, in the anti-clockwise direction against the action of the spring, 95k. Hereby the nose, 95m, of the lever, 95, acts on the limb, 333, of the lever 301 (Figure 11) and swings the same in this manner round its pivot, 304 in the clockwise direction against the action of the spring, 336, whereby the nose, 301g, of the lever 301 moves out of the stop 327g, of the pawl, 327, associated with the next higher place which pawl lies in a plane with the second number roller ZR, from the right, i. e. the ten's place. Further, the nose 327g of the pawl 327 enters under the action of the spring, 336, into the stop, 301h of the lever 301 whereby the nose 298 of the lever 301 releases the nose 292b, of the associated toothed segment 292.

On the rollers 275 running up at, 277a, on the cams 277 (Figure 11), the levers 272, are swung in the anti-clockwise direction. Hereby the bridge 271 of the arms 279 acts on the parts 268d of the driving sectors 268 and swings the same (i. e. only those in the calculating positions in question of which a value is set) in the anti-clockwise direction.

In this swinging movement of the driving sectors, 268 (Figure 11) round the shaft 267 in the anti-clockwise direction, all the toothed segments 292 except the toothed segment of the ten's place, are held by the nose, 298, of the levers, 301, after the number rollers ZR were rotated by the toothed segments 292, by way of the toothed wheels, 356, 361, (Figure 12), 357a, 362 and X, through an amount corresponding to the set value. After the parts, 292b, of the toothed segments, 292, strike against the noses, 298 of the levers 301, the driving sectors 268 concerned are swung still farther in the anti-clockwise direction until the rollers 275 (Figure 11) have arrived eventually on the concentric part of the cams, 277. The further swinging of the driving sectors, 268, is possible without any difficulty, since the toothed segments 292 are rotatably mounted at the points, 289, on the driving sectors, 268, and during the calculating operation, are held by means of the springs 295 with their projections, 286, in connection with the projections, D59, of the driving sectors.

Consequently, all the calculating segments, 292, are held by the tens shift lever 301 (Figure 11) which has not been released, while the calculating segment 292 associated with the tens place in consequence of its release by its associated lever 301, takes part fully in the movement of the calculating segments, 268, and is therefore shifted one unit further than the remaining calculating segments, 292. In this manner, therefore, as in the calculating example 8—5 above mentioned, no value was set in the tens place, the calculating segment 292 is moved on the whole only through one unit.

Shortly before the completion of a revolution of the shaft, 106 (Figure 11) in which revolution the cams 340 also participate, the rollers 342 of the levers 341 have moved down from the faces 340a, of the cams 340 on to the lower part 340b of the same, whereby the levers, 341, are swung in the anti-clockwise direction in consequence of the pull of the spring 354. Herewith, the limb, 347, of the bridge 343 (Figure 11) acts on the nose 350 of the pawl 327, of the tens place and swings the same in the clockwise direction against the action of the spring 336, whereby the nose 327g of the pawl 327, moves out of the stop, 301h, of the lever 301 so that the lever 301 is swung under the action of the spring 336, until the nose 298 of the lever 301 lies on the nose 292b of the segment 292. With this the nose 298i of the lever 301, moves in front of the nose 327g, of the pawl 327.

On the further rotation of the shaft 106 (Figure 11) the rollers, 32, move up on to the raised parts 340d of the cams 340, whereby the levers 341 are now swung in the clockwise direction. The edge 343f, of the bridge, 343, hereby acts on the segment 292 and swings this round the point 289 in the clockwise direction against the action of the spring 295.

As soon as the nose 292b (Figure 11) of the segment 292 releases the nose, 298 of the lever 301, the lever 301, swings in the anti-clockwise direction under the action of the spring 336, until the nose 301g of the lever 301, is held by the nose 327g of the pawl 327, with which the parts 301, 327 and 292 have again taken up their rest position illustrated in Figure 11. After the revolution of the shaft, 106, has terminated, the parts 340, 342, and 341, again take up their rest position illustrated in Figure 11.

Cross totalizer Q

On the set-screw 383 screwed into the intermediate wall 19 (Figures 14, 15 and 16) and on the set screw 384, screwed into the right-hand side wall, Sr, of the adding machine 3, a shaft 385 is rotatably mounted. On the left hand end of the same, a plate 386 is rigidly mounted by means of a pin 386b, which projects through its hub 386a. On the plate 386 the pins 222 and 223 (Figures 9, 9a and 14) are rigidly mounted. The cross-totalizer Q is held in the disconnected position by the roller lever 388b (Figures 11 and 15) which is swingably mounted on the side wall, Sr, by means of a screw 388c and is constrained by the tension spring 388d so that its roller 388 is located in the recess 388a. By means of the nuts 389 a shaft 390 is rigidly mounted in the side plates 387 and 388 which form the frame proper for the cross totalizer Q and on this shaft the number rollers 391 are rotatably mounted. The toothed wheels 392 are rigidly connected to the number rollers 391 and the toothed wheels 392 are in engagement with the toothed wheels 393 which are rotatably mounted on the shaft 395 rigidly mounted in the two side walls 387 and 388 by means of the nuts 394. The toothed wheels 393, again are in engagement with the toothed wheels 316 which are rotatably mounted on the shaft 398 rigidly mounted in the two side walls 387 and 388 by means of the nuts 397. On the shaft 400 rigidly mounted by means of the nuts 401 between the two side walls 387 and 388 of the cross totalizer Q the toothed wheels 315 are rotatably mounted, which again are in engagement with the toothed wheels 316. Each of the toothed wheels 316 and 315 according to whether the number rollers 391 are to be acted upon in the positive or negative direction, can be brought into engagement with the teeth of the toothed segment 293 (Figure 11). If the toothed wheels 315 move into engagement with the teeth of the toothed segment 293, on the operation of the machine the toothed wheels 315 are acted upon by the toothed segment, 293 in the direction of the arrow "g", Figure 16 and the number rollers 391 are rotated by way of the toothed wheels 316, 393 and 392 in the positive direction. If, on the contrary, the toothed wheels 316 move into engagement with the teeth of the toothed segment 293, the number rollers 391 are acted upon in the negative direction by way of the toothed wheels 393 and 392.

On the side part 387 of the cross totalizer Q there is swingably mounted a lever 403 (Figures 11, 15 to 17) by means of the screw 402. This lever is rigidly connected by means of a bridge 404 to the lever 406, which is swingably mounted on the right-hand side wall 388 of the cross totalizer Q by means of a screw 405 (Figure 14). The toothed shaped part 407 of the angle-shaped bridge 404 is capable of engaging with the tooth spaces of the toothed wheels 393 and in this manner lock the toothed wheels 315, 316, 393, 392 and the number rollers 391 in the disconnected position. By means of the spring 410 (Figures 14 to 15) which on the one hand engages with the pin 408 of the right-hand side part 388 (Figure 14) of the cross totalizer Q and on the other hand is connected to the pin 409 of the lever 406, the locking yoke consisting of the levers 403, 406 and the bridge 404 is acted on in the anti-clockwise direction round its pivots 402 and 405, whereby the part 407 of the locking yoke is held in engagement with the tooth spaces of the toothed wheels 393 (Figure 15).

If the cross totalizer Q is swung into the addition position (Figure 16), whereby as already mentioned, the toothed wheels 315 move into engagement with the teeth of the toothed segment 293, the pin 411 (Figures 14 to 17) of the member 411b, adjustably mounted by means of the screws 411a on the right-hand side wall Sr, of the adding machine 3, acts on the face 412 (Figure 16) of the lever 406, and swings the same in the clockwise direction, whereby the tooth-shaped part 407 of the bridge 404 moves out of engagement with the toothed wheels 393 and these wheels together with the toothed wheels 315, 316 and 392 in engagement with them are unlocked.

If, on the contrary, the cross-totalizer Q, is swung into the subtraction position (Figure 17), whereby the toothed wheels 316 move into engagement with the teeth of the toothed segments 293 (Figure 11), then the pin 413 of the member 415 adjustably mounted by means of the screws 414 on the right-hand side-wall, Sr, of the adding machine 3, acts on the face 416 of the lever 406 and swings the same in the clockwise direction round the screw 405. In this swinging movement the bridge 404 associated with it and the lever 403 likewise participate, whereby the tooth-shaped part, 407, moves out of engagement with the toothed wheels 393 and in this manner, the toothed wheels 316, 393 and 392 are unlocked.

Cross totalizer Q₁

A shaft 419 (Figures 11, 18 to 21) is rotatably mounted by means of the set-screws 418 (Figure 18) screwed into the intermediate wall 19 and into the right-hand side wall Sr, of the adding machine 3. On the left-hand end of the shaft, a plate 421 is non-rotatably mounted by means of the pin 420. On this plate, the pins 163 and 164 (Figures 9b and 18) are rigidly mounted.

The cross totalizer Q₁ is likewise held in the uncoupled position by the roller lever 424b (Figures 19 and 11) which is swingably mounted in the side wall Sr by means of the screw 424c and which is constrained by a tension spring 424d, so that its roller 424e, rests in the recess 424a of the plate 424. By means of the nuts 425 (Figures 11, 18 to 21) a shaft 426 is non-rotatably mounted on the two plates 423 and 424, fixed on the shaft 419. On the shaft 426 the number rollers 427 are rotatably mounted. With these are rigidly connected the toothed wheels 428. These are in engagement with the toothed wheels 429, which are rotatably mounted on the shaft 431 rigidly mounted by means of the nuts 430 in the two side walls 423 and 424. The toothed wheels 429 again are in engagement with the toothed wheels 319 which are rotatably mounted on the shaft 433 rigidly mounted by the nuts 432 in the two side walls 423 and 424. The toothed wheels 319 are likewise in engagement with the toothed wheels 320, which are rotatably mounted on the shaft 435, rigidly mounted in the two side walls 423 and 424, by means of the nuts 434. The toothed wheels 319 and 320 can be brought into engagement alternatively with the teeth of the toothed segment 294 (Figure 11) according as the number rollers are to be rotated in the positive or negative direction. If the cross totalizer Q₁ is to operate in the positive direction, on the operation of the machine, the toothed wheel 319 moves into engagement with the teeth of the toothed segment 294, whereby the toothed wheels 319 are rotated in the direction of the arrow "h" (Figure 20) and by way of the toothed wheels 429 and 428, the number rollers are rotated in the direction of the arrow "k", i. e. in the positive direction. If, on the contrary, the toothed wheels 320 are brought into engagement with the toothed segment 294 (Figure 11) the toothed wheels 320 are rotated in the direction of the arrow "m" (Figure 21) and the number roller 427 are rotated in the direction of the arrow "n" by way of the toothed wheels 319, 429 and 428, i. e. are rotated in the negative direction.

On the side member 423 (Figures 18 to 21) of the cross totalizer Q₁ a lever 437 is swingably mounted by means of the screw 436, which lever is rigidly connected by means of a bridge, 438, with the lever 439 which is swingably mounted by means of the screw 440 on the right-hand side member 424. The bridge 438 has its angle-shaped part 441 formed as a tooth and with this part engages in the tooth spaces of the toothed wheels 320 whereby the toothed wheels 319, 320, 429 and 428 and the number rollers 427 are locked in the disconnected position (Figure 19) in which the lock is held by means of a spring 444 (Figures 18 and 21) which on the one hand engages with a pin 442 fixed on the right-hand side member 424 (Figure 18) of the cross totalizer Q₁ and on the other hand is connected to the pin 443 of the lever 439.

On swinging the cross totalizer Q₁, into the addition position, (Figure 20), the pin 445, of the member, 447, movably mounted by means of the screws 446 on the right-hand side wall, Sr, of the adding machine 3, acts on the face, 448 of the lever, 439, and swings the same and the bridge 438 connected with it, in the anti-clockwise direction, whereby the tooth-shaped part, 441 of the bridge 438 moves out of engagement with the toothed wheels 320, and, as a consequence, the toothed wheels 319, 320, 429, 428 and the number rollers 427, are unlocked. If, on the contrary, the cross totalizer Q₁, is swung into the subtraction position (Figure 21), the pin, 449 of the member 451, mounted by means of the screws 450 on the right-hand side wall Sr, of the adding machine 3, acts on the face 452 of the lever 439 and swings the same and the bridge 438 connected to it, in the anti-clockwise direction, whereby the toothed-shaped part, 441, releases the toothed wheels 320. Since the method of operation of the mechanisms for the cross totalizer Q has been shortly described as description of the method of operation for the cross totalizer Q₁ generally may be omitted since all further information may be obtained from the clear drawings (Figures 9b, 8 and 10).

*Printing mechanism*

The printing mechanism is arranged between the two printing mechanism frame walls D34 arranged in the machine of which in Figure 23 however, only the right is visible.

Between the two printing mechanism frame walls D34 (Figure 23) a part D36 of angular formation, having both of its free ends bent rearwardly at right angles is secured by means of the screws D35, to the right-hand printing mechanism frame wall D34 and is fastened by means of screws (not shown) to the left-hand printing mechanism frame wall D34. This part D36 is provided with as many slots (not shown) as there are printing rods.

The slots serve as guides for printing rods T. The printing rods T are so arranged that the distance of the single figures from one another of a value brought to impression on the platen is equal to the distance of the letters of the printed text.

The angle shaped part D36 is still further provided with holes (not shown) and pins D36a, from which are hung the springs T₁ (Figure 23), which at their other ends are connected to the noses D37 of the type printing rods T and act upon these rods in the direction of the arrow D.

By means of screws D38 (Figure 23), a part D39 of angular formation and with its free ends bent forwardly at right angles is further fixed to the right, printing mechanism frame wall D34 and to the left printing mechanism frame wall D34 by means of screws (not shown). The part D39 similarly to the part D36 is provided with slots (not shown) which likewise serve as guides for the printing rods T.

Further in the zone of the lower ends of the printing rods T and between the two printing mechanism frame walls D34 (Figure 23) a part D40 of U-shape, having both its free ends bent upwards at right angles is arranged. This is fastened to the right-hand printing mechanism frame wall D34 by means of screws D42 (Figure 23) passing through its bent lug D41 and to the left hand printing mechanism frame wall D34 which is not shown. The part D40 is provided with slots (not shown) which serve as guides for the printing rods T. The parts D36, D39, D40 and D34 form the printing mechanism frame proper.

On the upper ends of the printing rods T lugs D43 are bent, so that a number of rectangular shaped recesses are formed, in which number printing types D44 are slidably arranged. In Figure 23, the cover plate is omitted in order to render the number types D44 visible. The number types D44 which on their rearwardly directed ends, carry the types D45, are provided with projections, D46 and D47 (Figure 23). By means of compression springs D48, which on one side rest against the left-hand lugs, D43, of the printing rods, T, and on the other side rest against the faces of the projections, D46, of the number types D44, the number types D44 are held in their rest position which is determined by the contact of the right-hand faces D46a of the number types, D44, against the right-hand lugs D43 of the printing rods T.

On the noses D49 of the printing rods T pins D26 (Figure 23) are riveted, which are embraced by fork-shaped arms 269 of the driving sectors 268 swingable around the shaft 267.

In both the printing mechanism frame walls D34, a shaft D144 (Figure 23) is fixed so as to be incapable of rotation. On this shaft D144 angle levers D145 alternately with a spacing ring (not shown) are rotatably mounted.

On the downwardly projecting limb D146 (Figure 23) of the angle lever D145 on each side of the same, a further lever D147 is jointed. Of the levers D147 only the left-hand one is visible in Figure 23. The levers D147 are rigidly connected to one another by means of pins, D148 and D149 which project through elongated holes D150, D151 in vertically slidably arranged slides D152. On the left hand levers D147, noses D153 are formed which are so bent that they lie in the plane of the slides D152. To the noses D153 springs D154 are connected which at their other end are attached to noses D155 of the slides D152. The springs D154 act upon the levers D147 and the slides D152 in such relation to one another, that the faces D156 and D157 of the elongated holes D150 and D151 of the slides D152, rest against the pins D148 and D149 fastened to the levers D147 whereby the normal position of the slides D152, in relation to the levers D147, is determined. Springs D158, which are connected on the one side to the noses D159 of the slides D152 and on the other side to an angle shaped part D160 act upon the slides D152, together with the lever D147 in the anti-clockwise direction and in the direction of the arrow "D".

The angle shaped part D160 is fixed by means of screws D162 which pass through the rectangular downwardly bent lugs D161 (in Figure 23 only the right hand lug is visible) formed on its free ends to the two parts of the printing mechanism frame walls D34. Through the upwardly-acting direction of the pull of the springs D158 the angle levers D145 are rotated in the clockwise direction round a shaft D144 and by the contact of their noses D163 with the bar 164 are held in their normal position.

Furthermore a connecting link D165 (Figure 23) is jointed on each side of the levers D145 between which links at their other free ends levers D166, are jointed. These are swingably mounted on a shaft D167, which is mounted in the two side walls D34, so as to be incapable of rotation and are guided in slots not shown in an angle-shaped comb D168, which is fixed to the side walls D34, by means of the screws D170 passing through the lugs D169, which are downwardly bent at right angles. In Figure 23 only the right hand fixing is visible. The free upwardly directed ends of the lever D166 formed to correspond in Figure 23 act on the number types D44. The downwardly directed free ends D152a of the slides D152 (Figure 23) are guided in slots (not shown) of the comb D171 which at its right-angled upwardly bent lugs D172 (in Figure 23 only the right is visible), is fastened by means of the screws, D38, to both of the printing mechanism frame walls D34 whereby yielding of the slides D152, laterally is avoided.

The slides D152 are further provided with recesses D174 (Figure 23) through which a rod D175, projects, which rod is fixed by means of screws to an angle-lever D177, swingably mounted on the right-hand printing mechanism frame wall, D34, by means of a screw D176 and also to an angle lever D177, swingably mounted by means of a screw (not shown) on the left-hand printing mechanism frame wall D34 (the angle lever D177, is not visible in Figure 25). Angle levers D177 form with the rod D175 the yoke D177, D175 and D177. The limbs D178 of the lever D177 which are constructed as shown in Figure 23 are at their free ends bent at right angles and co-act with the cams D179 (in Figure 23 only the right-hand cam is visible) on the shaft 106.

The downwardly directed ends D152a (Figure 23) of the slides D152 are of hook shape. With the recesses D180 of the same a bridge D181 of a U-shaped yoke D182, D181, D182 can engage. The latter is swingably mounted by means of its limbs D182 (of which in Figure 23 only the right-hand limb is represented) on the shaft D183 which is mounted so as to be non-rotatable in the supporting frame walls D34 of the machine. To the downwardly directed limbs D184 of the yoke D182, D181, D182 two parts D185 are fixed one to each side of each limb.

Between the parts D185 a roller D186 is rotatably mounted, which co-acts with the cams D187 on the driving shaft 106. To the limbs D184 of the yoke D182, D181, D182 springs D188 are connected which with one of their ends are attached to the upwardly projecting limbs of the angle levers D177 of the yoke D177, D175 and D177, whereby these and the yoke D182, D181, D182 are acted upon in the clockwise direction. Consequently the right-angled bent lower ends of the limbs D178 of the yoke D177, D175, D177 rest against the cams D179 and the rollers D186 arranged in the parts D185, rest against the cams D187, whereby the normal position of the yoke D177, D175 and D177, as well as of the yoke D182, D181 and D182 is determined. From the downwardly directly hook-shaped parts D152a of the slides D152 noses D190 (Figure 23) are pressed out, which co-act with stops D191 on the two-armed levers D192. The levers D192 are swingably mounted on the shaft D193 which is mounted so as to be non-rotatable in the two supporting frame walls D34 of the machine. On the limbs D194 of the two-armed levers D192 noses D195 are formed which can co-act with the lugs D196 formed on the driving segments, 268.

On the levers D192 further are lugs D197 (Figure 23) which are bent to the left so that the lug D197 on the lever D192, disposed farthest to the right rests on the face D198 of the lever D192 next to the left, the lug D197 of this lever again rests on the lever D192, lying next to it on the left and so forth.

Springs D199 (Figure 23) which on one side are attached to the limbs D194 of the levers D192 and on the other side to pins D200, fixed in the machine frame, act upon the levers D192 in the anti-clockwise direction. Through the contact of the noses D190 of the slides D152 against the stop faces D191 of the levers D192 by the horizontal pull of the already mentioned springs D158 the normal position of the slides D152 is determined.

*Operation of the printing mechanism*

If now the machine is set into operation by depression of the motor key 11 (Figure 1) whereby the shaft 106 (Figure 6) and all of the cams fixed to the shaft 106 are driven in the anti-clockwise direction, the driving sectors 268 are actuated as described under the heading "Operation of the driving mechanism".

Hereby only the printing rods T (Figure 23), however, are acted upon which have been released by the zero flap u arranged in the stop carriage S (Figure 11) on the stepwise lateral movement of the stop carriage during the value setting. Here, the printing rods, T, are acted upon so far in the direction of the arrow T until the numeral types D44 of the printing rods T corresponding to the set value have arrived at the printing position indicated by the line $x-x$ in Figure 23.

In the rotation of the released sectors 268 (Figure 23) in the clockwise direction, the lugs D196 of the set sectors 268 act further on the noses D195 of the levers D194 whereby these are swung round the shaft, D193, in the clockwise direction and against the action of the springs D199 and thus the lugs D190 of the slides D152 are released. As soon as the slides D152 after release by the levers D194 are swung in the anti-clockwise direction, the faces D194a of the levers D194 are positioned under the action of the springs D199 on the lugs D190 of the slides D152. In the swinging of the slides D152 in the anti-clockwise direction the recesses D152A of the slides D152 have moved into the path of movement of the bridge D181, of the yoke D185—D181—D185.

In the further rotation of the shaft 106 (Figure 23) the raised portion D187a of the cams D187 act on the rollers D186 of the yoke D185—D181—D185, whereby this is swung in the anti-clockwise direction and against the action of the springs D188. In this swinging movement of the yoke D185—D181—D185, the bridge D181 acts on the faces D152B of the slides D152 and consequently takes the latter downwards along with them against the action of their springs D153. Since the slides D152 are positively connected with the members D147 by the springs D154, these participate in the downward movement. The angle levers D145, jointed to the slides D147 are consequently swung in the anti-clockwise direction around their pivot shaft, D144. Hereby the connecting rods D165 swing the levers D166 round the shaft D167 in the anti-clockwise direction, whereby the parts, D166a (Figure 23) of the levers D166 strike against the numeral types D44 lying opposite to them and cause these to strike against the platen Sx in opposition to the action of their springs D46, the platen Sx being common both to the adding machine 3 and the typewriter 2.

As soon as the type is pressed hard up against the paper on the platen Sx, the corresponding spring D154, yields. The tension of the springs D154 is of such value that in all cases with possible inequalities of the paper layer a faultless impression is obtained and with increased layers of paper, the impression pressure of the type against the paper is automatically increased in consequence of the tension of the springs D134, caused by the thicker paper layer.

On the further rotation of the cams D187 (Figure 23) the rollers D186 move off from the raised parts D187a, of the cams, D187, whereby the yoke D185—D181—D185 is released, and is acted on by its spring D188 in the clockwise direction. Since the yoke D185—D181—D185 thus releases the slides D152, these, under the action of the springs D154 and D153, which engage with them, can move again into their rest position in relation to the levers D147 and move upwards along with them, whereby they take up the position illustrated in Figure 23. Likewise, the parts D145, D165, D166 return to their rest position under the action of the springs D158 which position is determined by the noses D163, striking against the bar D164. The number types D44, likewise, return into their rest position under the action of their springs D46.

I claim:

1. In a combined typewriter and computing machine, the combination with a totalizer and differential actuating mechanism therefor including a power driven shaft, of means for engaging and disengaging said totalizer and actuating mechanism comprising a settable member, means for pre-setting said settable member, a series of cams on said shaft for variably operating said settable member, operating connections between said settable member and said cams adapted for selective setting into operative relation with any cam of said series and means for selectively setting said connections.

2. In a combined typewriter and computing machine, the combination with a totalizer, and differential actuating mechanism therefor including a power driven shaft, of means for engaging and disengaging said totalizer and actuating mechanism comprising a settable member, means for pre-setting said settable member, a series of cams on said shaft for variably operating said settable member, operating connections between said settable member and said cams adapted for selective setting into operative relation with any cam of said series, means for selectively setting said connections, and a manipulative member connected to said pre-setting means for reversing the settings of said settable member.

3. A combined typewriting and computing machine according to claim 1 wherein the cams operate the totalizer engaging means in item accumulating, total taking, and sub-total taking operations respectively.

4. In a combined typewriter and computing machine, the combination with a frame and a travelling carriage, a totalizer on the frame, a totalizer on the carriage travelling therewith, and differential actuating mechanism common to said totalizers and including a power driven shaft, of means for engaging the first mentioned totalizer with said actuating mechanism, and means for variably operating said engaging means to effect the performance of different operations in said first named totalizer comprising, a series of cams on said shaft, operating connections between said series of cams and said engaging means adapted for setting relative to said series of cams, and means on the second mentioned totalizer rendered effective by travel of the latter for setting said operating connections relative to said series of cams.

5. A combined typewriter and computing machine according to claim 1 wherein said operating connections include a member rocking about an axis parallel with the axis of the drive shaft, and a second member mounted on the first mentioned member and rocking about an axis perpendicular to the axis of the first mentioned member, said first mentioned member being connected to said settable means to operate the same and said second mentioned member being connected to said selectively setting means and controlled thereby to cooperate with different cams of said series.

6. A combined typewriter and computing machine according to claim 1 wherein said operating connections include levers forming a bridge over said cams, rollers on said levers engaging said cams and a member movable across said levers for selection of said cams.

7. A combined typewriter and computing machine according to claim 1, wherein said totalizer engaging and disengaging means includes planetary gearing shiftable to control the operation of the totalizer, and the settable member comprises a substantially T shaped member the cross bar of which is fork shaped for shifting said gearing.

8. In a combined typewriting and computing machine, the combination with a totalizer, and differential actuating mechanism therefor including a power driven shaft, of means for engaging the totalizer with said actuating mechanism, means for variably operating said engaging means to effect the performance of different operations in said totalizer including a series of cams on said shaft, operating connections between said series of cams and said engaging means settable to predetermine the character of operation to be performed, means for setting said connections, a reversing member having opposed V-shaped cut outs therein, pins on said setting means, one for each cut-out and with which the latter are adapted to cooperate to reverse the settings effected by said setting means, said reversing member being movable for cooperation of related cut-outs and pins, and a manipulative member for moving said reversing member.

9. In a combined typewriter and computing machine, the combination with a totalizer and differential actuating mechanism therefor including a power driven shaft, of means for coupling the totalizer and actuating mechanism for variable operation of the former by the latter to effect the performance of different operations in said totalizer and including, a rocking frame movable in opposite directions, respectively, gearing in said frame operatively coupling said totalizer and mechanism upon movement of said frame in either direction, means for rocking said frame comprising a lever settable to predetermine the direction of movement of said frame, means for setting said lever, a series of cams on said shaft, operating connections between said series of cams and said lever including a part settable into operative relation to selected cams of said series, and a manipulative member for setting said part.

10. In a combined typewriting and computing machine, the combination with a totalizer including transfer mechanism, and differential actuating mechanism for said totalizer including a power driven shaft, of means for engaging said totalizer with said mechanism, and means for variably operating said engaging means to effect the accumulation of items in the totalizer and total and sub-total taking operations, respectively, said operating means including, an item accumulating cam and total and sub-total taking cams respectively mounted on said shaft, operating connections between said cams and engaging means adapted for setting into operative relation to one of said cams, setting means for said connections, and means operatively connected to said setting means for locking said transfer mechanism as an incident to setting said connections into operative relation to said total and sub-total taking cams respectively.

11. In a combined typewriting and computing machine the combination with a frame and carriage, of a totalizer on the frame and a detachable totalizer on the carriage, and differential actuating mechanism common to said totalizers and including a power driven shaft, of means for engaging the first named totalizer with said actuating mechanism and disengaging the same therefrom said means comprising a settable member, a series of cams on said shaft for variably operating said settable member, settable operating connections between said settable member and said cams, a settable cam on the second named totalizer, a controlling linkage between said settable cam and said operating connections operative by said cams for the selective setting of said connections into operative or inoperative relation with any one of said series of cams, a second settable cam on said second named totalizer and a controlling linkage between said settable member and said second named settable cam for controlling the setting of said settable member.

12. In a combined typewriter and computing machine, the combination with a frame, a totalizer on the frame, of differential actuating mechanism for said totalizer including a rotary shaft comprising, means for engaging said totalizer with and disengaging the same from said actuating mechanism, means for variably operating said engaging and disengaging means to effect the performance of different operations in said totalizer and including a series of cams on said shaft, operating connections between said cams and said engaging and disengaging means, said last means including a coupling for rendering the same effective or ineffective, and means for controlling said coupling comprising a single manually manipulative member.

13. In a combined typewriter and computing machine, the combination with a frame and travelling carriage, of a totalizer on the frame, a totalizer on the carriage, travelling therewith, of differential actuating mechanism common to said totalizers including a power driven shaft comprising, means operative for engaging the first named totalizer with and disengaging the same from said actuating mechanism and settable for variable operation to effect in the first named totalizer the performance of different operations, operating means for said engaging and disengaging means including a series of cams on said shaft, operating connections between said cams and said engaging and disengaging means, means operative by the travelling totalizer for setting the engaging and disengaging means, and means for locking the engaging and disengaging means in set position and including a cam on said shaft for rendering said locking means effective.

14. In a combined typewriting and computing machine, the combination with a frame and a totalizer on the frame, of differential mechanism for said totalizer including oscillating actuators normally disengaged from said totalizer and a power driven shaft, means for engaging said totalizer with said actuators for the taking of totals and subtotals, and means for locking said totalizer in engaged position during one stroke of said actuators in the taking of totals and subtotals and including locking levers, a locking yoke cooperating with said levers, and cams on said shaft for controlling said yoke.

15. In a combined typewriter and computing machine, the combination with a frame, a traveling carriage on the frame, and a totalizer on the carriage travelling therewith, of differential mechanism for said totalizer including oscillating actuators and a power driven shaft, a swingably mounted frame intermediate said totalizer and actuators having wheels mounted therein adapted by swinging of said frame to engage said totalizer wheels and actuators respectively, and normally disengaged therefrom, means operative by said shaft to swing said frame and engage the wheels therein with said totalizer wheels and actuators for the taking of totals and subtotals, means for locking the frame during one stroke of the actuators in the taking of totals and subtotals and including a locking lever, a locking yoke cooperating with said lever, and a cam on said shaft for controlling said yoke.

HUGO ERNST KÄMMEL.